(12) United States Patent
Wookey

(10) Patent No.: US 7,293,042 B2
(45) Date of Patent: Nov. 6, 2007

(54) MANAGING AND PREDICTING COMPONENT FAILURE BASED ON PATTERN RECOGNITION OF SUBCOMPONENT EXPOSURE TO FAILURE

(75) Inventor: Michael J. Wookey, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 519 days.

(21) Appl. No.: 10/691,278

(22) Filed: Oct. 22, 2003

(65) Prior Publication Data

US 2004/0230597 A1 Nov. 18, 2004

Related U.S. Application Data

(60) Provisional application No. 60/469,767, filed on May 12, 2003.

(51) Int. Cl.
*G06F 7/00* (2006.01)
*G06F 17/00* (2006.01)

(52) U.S. Cl. .................................. 707/104.1
(58) Field of Classification Search ............ 707/104.1; 702/183; 347/211; 714/52, 39; 709/24
See application file for complete search history.

(56) References Cited

U.S. PATENT DOCUMENTS

| 6,188,423 B1 * | 2/2001 | Pou ........................... 347/211 |
| 7,006,947 B2 * | 2/2006 | Tryon et al. ................. 702/183 |
| 7,107,339 B1 * | 9/2006 | Wolters ....................... 709/224 |

OTHER PUBLICATIONS

Salfner et al., "Predicting Failures of Computer Systems: A Case Study for a Telecommunications System", Proceedings of 11th IEEE Workshop on Dependable Parallel, Distributed and Network-Centric Systems (DPDNS'06); Rhodes Island, Greece; Apr. 2006.*
Khoshgoftaar et al., "Predicting Fault-Prone Software Modules in Embedded Systems with Clasification Trees", 4th IEEE International Symposium on High-Assurance Systems Engineering pp. 105-112; 1999.*

* cited by examiner

*Primary Examiner*—Jeffrey Gaffin
*Assistant Examiner*—Michael J Hicks
(74) *Attorney, Agent, or Firm*—Sonnenschein Nath & Rosenthal LLP

(57) ABSTRACT

Methods, systems, and articles of manufacture consistent with the present invention provide for predicting system failure based on pattern recognition of subcomponent exposure to failure. A dataset is generated that has at least one exposure level to failure of a computer-based system and a corresponding rule identifier of a rule used to calculate the exposure level. The rule asynchronously receives information about the computer-based system and calculates the exposure level based on the received information. The generated dataset is compared to a previously generated dataset by comparing the at least one exposure level of the dataset to an at least one exposure level with the same rule identifier in the previously generated dataset, where the previously generated dataset is associated with a known problem with the computer-based system. A probability of a problem with the computer-based system is calculated based on a number of exposure levels in the generated dataset matching exposures levels in the previously generated dataset.

19 Claims, 21 Drawing Sheets

MANAGING AND PREDICTING COMPONENT FAILURE BASED ON PATTERN RECOGNITION OF SUBCOMPONENT EXPOSURE TO FAILURE

CROSS-REFERENCE TO RELATED APPLICATIONS

This Application claims the benefit of the filing date and priority to the following patent applications, all of which are incorporated herein by reference to the extent permitted by law:

U.S. Provisional Application Ser. No. 60/469,767, entitled "METHODS AND SYSTEMS FOR INTELLECTUAL CAPITAL SHARING AND CONTROL", filed May 12, 2003.

Additionally, this Application is related to the following U.S. patent applications, which are filed concurrently with this application, and which are incorporated herein by reference to the extent permitted by law:

Application Ser. No. 10/690,917, entitled "NEAREST NEIGHBOR APPROACH FOR IMPROVED TRAINING OF REAL-TIME HEALTH MONITORS FOR DATA PROCESSING SYSTEMS";

Application Ser. No. 10/690,866, entitled "DYNAMIC RULE DEPLOYMENT FOR A SCALEABLE SERVICES RULES ENGINE";

Application Ser. No. 10/690,951, entitled "MANAGING EXPOSURE TO FAILURE FOR COMPUTER BASED SYSTEMS";

Application Ser. No. 10/690,952, entitled "MANAGING AND PREDICTING RISK FOR COMPUTER DEVICES USING EXPOSURE MANAGEMENT TECHNIQUES"; and Application Ser. No. 10/691,039, entitled "A PUBLISH-SUBSCRIBE SYSTEM FOR INTELLECTUAL CAPITAL MANAGEMENT".

FIELD OF THE INVENTION

The present invention relates to risk management of computer-based systems and, more particularly, to detecting system problems using pattern recognition.

BACKGROUND OF THE INVENTION

Some of the challenges in managing and supporting computer systems are the growing complexity of the components and their relationships within the greater system. To avoid unpredictable results, vendors set forth constraints for systems to describe what components are supported within a certain tolerance. Customers, however, typically do not want to be restricted by the vendors' constraints and prefer to control the types of components used in their systems and to manage those components. This presents a conflict, which is compounded by increasing system complexity.

One approach to avoiding unpredictable results is to implement a risk management system that determines whether a customer's system configuration meets the criteria of an ideal configuration. Conventional risk management systems use simple checks or rule engines to determine whether a customer's existing configuration meets the requirements of a new component. Each rule engine defines a simple If . . . Then . . . relationship, such as if the customer wants to install disk driver X and has hard disk drive Y, then there is a compatibility problem.

A problem arises in that the knowledge built into these conventional risk management systems and rule engines is static or difficult to update. Computer systems continually increase in complexity and the knowledge required to maintain the computer systems increases and changes. Therefore, conventional risk management systems are inadequate for services organizations that support dynamic computer systems.

An additional problem is that, although conventional systems can define a simple If . . . Then . . . relationship to diagnose a fault, they are unable to understand why a failure happened or preempt the failure.

Further, in serviced computer systems, problems tend to repeat and the more complex the problems are, the more difficult it typically is to detect the problems. Thus, conventional fault management systems typically cannot detect the problems as often the problems are not manifested as known faults in the system.

SUMMARY OF THE INVENTION

Methods, systems, and articles of manufacture consistent with the present invention dynamically monitor the exposure to failure of computer-based systems and calculate a risk level of the systems based on the exposure to failure. Computer-based systems, such as data processing systems, storage devices, and computer programs are each registered as entities on a publish-subscribe network, or bus. A client module associated with each entity asynchronously publishes hardware and software configuration information and fault information relating to the entity to the bus. One or more rule engines, which are deployed in the publish-subscribe network, asynchronously subscribe to the configuration and fault information. Each rule engine performs a unique test on the incoming information to determine whether there is a potential future problem. If a rule engine fires, indicating a potential problem, the result indicates a level of exposure to failure for the entity. In turn, each exposure level is assigned a confidence level, which identifies how accurate the exposure level is believed to be. If two or more rule engines that are analyzing a similar problem fire, then the confidence level is accordingly increased.

Therefore, the output of the rule engine processing is a series of exposure levels. The range of the exposure levels and their respective confidence levels are used to predict potential future problems and measure the system's service stability.

The series of exposure levels for an entity, which exposure levels are referred to as exposure sets, are then plotted on a curve for each rule relating to the entity. The curve is compared to known curves that are each attributed to a particular known problem. Depending on how close a match there is between the curve and one of the known curves, the program calculates a probability of the system having the potential problem associated with the known curve. In other words, if the exposure levels on the curve matches most of the exposure levels on the known curve, then there is a high probability that there is a potential problem.

In an illustrative example, a data processing system comprises a number of customer systems connected to a publish-subscribe bus. One of the customer systems has a hard disk type X, and a hard disk driver Y was recently installed on the customer system. A services organization system has deployed in its memory a number of rule engines, with each rule engine asynchronously subscribing, via the bus, to specific information about customer systems to determine whether there is a potential problem. Through its experience with the customer systems, the services organization has determined that if a customer system is configured with hard disk type X and hard disk driver Y, there is a chance of failure of the customer system at some point after installation of the hard disk driver. Therefore, the services organization has configured one of the rule engines to fire if it receives input data indicating that a customer system has hard disk type X and hard disk driver Y. Another rule engine is configured to fire if it receives input data indicating that a customer system has hard disk type X and does not have hard disk driver Z, version 2.0 or greater. Since the services organization has determined that each of these potential problems can cause detrimental effects on the overall data processing system, it has assigned the exposure level value for each of these rules firing to be 100 in a range from 0 to 100.

When the first rule engine receives the customer hardware configuration information, it identifies the potential problem and outputs an exposure level of 100 and a confidence level of 0.5 in a range from 0 to 1.0. The second rule engine then fires and outputs an exposure level of 100, but with a confidence level of 1.0, based on the knowledge that a similar rule also fired. Further processing using these exposure levels and confidence levels, leads to a service action message being published that identifies a potential problem with the customer system. New rule engines are asynchronously dynamically deployed or existing rule engines are discontinued as required to service the changing customer systems and as the services organization's knowledge increases.

Therefore, unlike typical risk management systems that are run on demand to perform discrete checks, such as to check a system configuration during a product installation, and that use static knowledge, methods and systems consistent with the present invention asynchronously monitor the correctness of computer systems using dynamic rule engines.

In accordance with methods consistent with the present invention, a method in a data processing system having a program is provided. The method comprises the steps performed by the program of: generating a dataset having at least one exposure level to failure of a computer-based system and a corresponding rule identifier of a rule used to calculate the exposure level, the rule asynchronously receiving information about the computer-based system and calculating the exposure level based on the received information; comparing the generated dataset to a previously generated dataset by comparing the at least one exposure level of the dataset to an at least one exposure level with the same rule identifier in the previously generated dataset, the previously generated dataset being associated with a known problem with the computer-based system; and calculating a probability of a problem with the computer-based system based on a number of exposure levels in the generated dataset matching exposures levels in the previously generated dataset.

In accordance with articles of manufacture consistent with the present invention, a computer-readable medium containing instructions that cause a data processing system having a program to perform a method is provided. The method comprises the steps performed by the program of: generating a dataset having at least one exposure level to failure of a computer-based system and a corresponding rule identifier of a rule used to calculate the exposure level, the rule asynchronously receiving information about the computer-based system and calculating the exposure level based on the received information; comparing the generated dataset to a previously generated dataset by comparing the at least one exposure level of the dataset to an at least one exposure level with the same rule identifier in the previously generated dataset, the previously generated dataset being associated with a known problem with the computer-based system; and calculating a probability of a problem with the computer-based system based on a number of exposure levels in the generated dataset matching exposures levels in the previously generated dataset.

In accordance with systems consistent with the present invention, a data processing system is provided. The data processing system comprises: a memory having a program that
    generates a dataset having at least one exposure level to failure of a computer-based system and a corresponding rule identifier of a rule used to calculate the exposure level, the rule asynchronously receiving information about the computer-based system and calculating the exposure level based on the received information,
    compares the generated dataset to a previously generated dataset by comparing the at least one exposure level of the dataset to an at least one exposure level with the same rule identifier in the previously generated dataset, the previously generated dataset being associated with a known problem with the computer-based system, and
    calculates a probability of a problem with the computer-based system based on a number of exposure levels in the generated dataset matching exposures levels in the previously generated dataset; and a processing unit that runs the program.

In accordance with systems consistent with the present invention, a data processing system is provided. The data processing system comprises: means for generating a dataset having at least one exposure level to failure of a computer-based system and a corresponding rule identifier of a rule used to calculate the exposure level, the rule asynchronously receiving information about the computer-based system and calculating the exposure level based on the received information; means for comparing the generated dataset to a previously generated dataset by comparing the at least one exposure level of the dataset to an at least one exposure level with the same rule identifier in the previously generated dataset, the previously generated dataset being associated with a known problem with the computer-based system; and means for calculating a probability of a problem with the computer-based system based on a number of exposure levels in the generated dataset matching exposures levels in the previously generated dataset.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention dynamically monitor the exposure to failure of computer-based systems. A client module associated with each computer-based system (i.e., an entity) asynchronously publishes hardware and software configuration information and fault information relating to the entity to a publish-subscribe network, or bus. One or more rule engines, which are deployed in the publish-subscribe network, asynchronously subscribe to the configuration and fault information. Each rule engine performs a unique test on the incoming information to determine whether there is a potential future problem. If a rule engine fires, indicating a potential problem, the result indicates a level of exposure to failure for the entity. In turn, each exposure level is assigned a confidence level, which identifies how accurate the exposure level is believed to be. If two or more rule engines that are analyzing a similar problem fire, then the confidence level is accordingly increased.

Therefore, the output of the rule engine processing is a series of exposure levels. The range of the exposure levels and their respective confidence levels are used to predict potential future problems and measure the system's service stability.

The series of exposure levels for an entity, which exposure levels are referred to as exposure sets, are then plotted on a curve for each rule relating to the entity. The curve is compared to known curves that are each attributed to a particular known problem. Depending on how close a match there is between the curve and one of the known curves, the program calculates a probability of the system having the potential problem associated with the known curve. In other words, if the exposure levels on the curve matches most of the exposure levels on the known curve, then there is a high probability that there is a potential problem.

Figure 1:
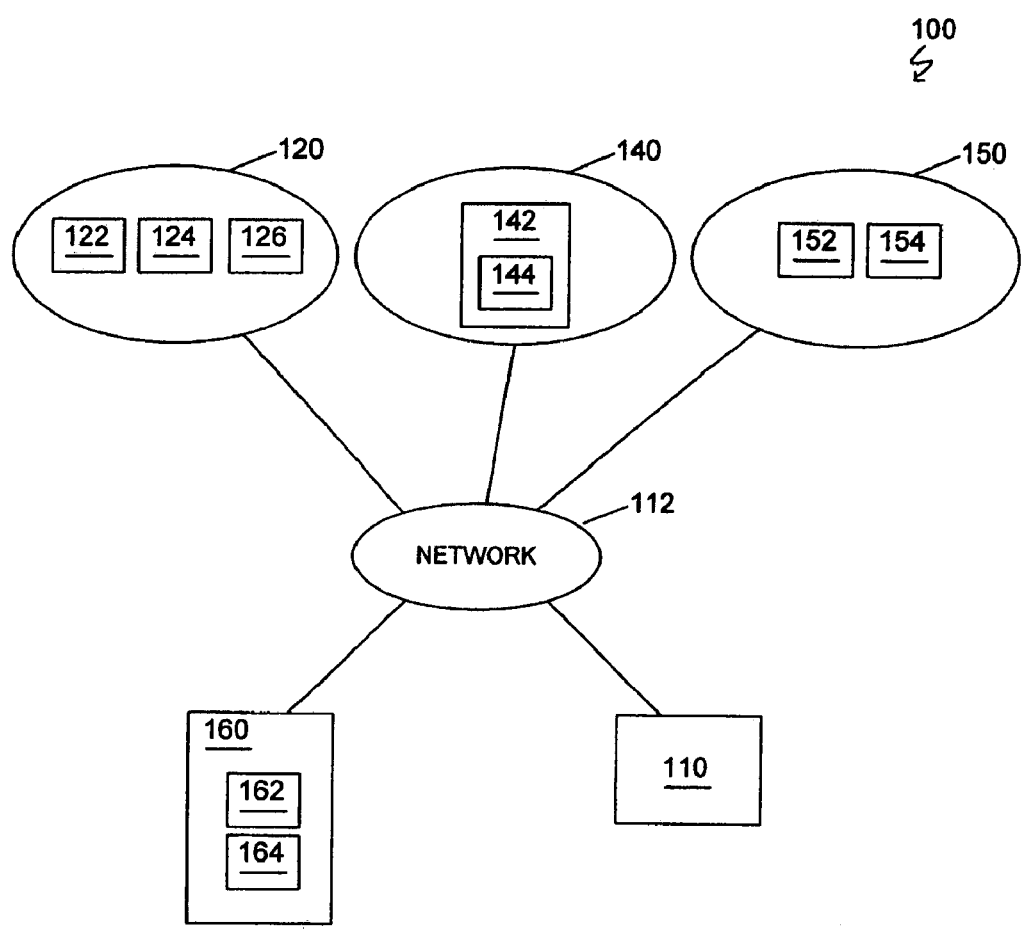
FIG. 1 shows a block diagram illustrating a data processing system in accordance with methods and systems consistent with the present invention.

FIG. 1 depicts a block diagram of a data processing system 100 suitable for use with methods and systems consistent with the present invention. Data processing system 100 comprises a services organization data processing system 110 ("the services system") connected to a network 112. The network is any suitable network for use with methods and systems consistent with the present invention, such as a Local Area Network, Wide Area Network or the Internet. At least one support asset is also connected to the network. A support asset is defined for purposes of this disclosure as an asset that is supported by the services organization and represents a generic object that is uniquely identifiable and serviceable. Illustrative examples of support assets include data processing systems of customers of the services organization, storage systems, and computer programs. One having skill in the art will appreciate that the support asset are not limited to these illustrative examples.

As shown in the illustrative data processing system of FIG. 1, support assets can be bundled into asset groups 120, 140 and 150. In FIG. 1, asset group 120 comprises support assets 122, 124 and 126; asset group 140 comprises support asset 142; and asset group 150 comprises support assets 152 and 154. The groupings can be automatically derived by the services organization or manually defined by the services organization or a customer. The grouping of assets can be related, for example, to a business or organizational function or a topological group, or to other criteria such as hardware or software type. For example, the support assets of asset group 120 can be data processing systems of a similar type at one or more customer locations. If the support assets are data processing systems, each support asset can comprise components similar to those described below with respect to the services system, such as a CPU, an I/O, a memory, a display device, and a secondary storage. Individual support assets and asset groups are collectively referred to herein as support entities.

Additional devices can also be connected to the network for use by the services organization. In the depicted example, a legacy data storage system 160, which has a legacy storage controller 162 and a legacy data storage device 164, is connected to the network. The services system can access information stored on the legacy data storage system to assist in servicing support entities.

Figure 2:
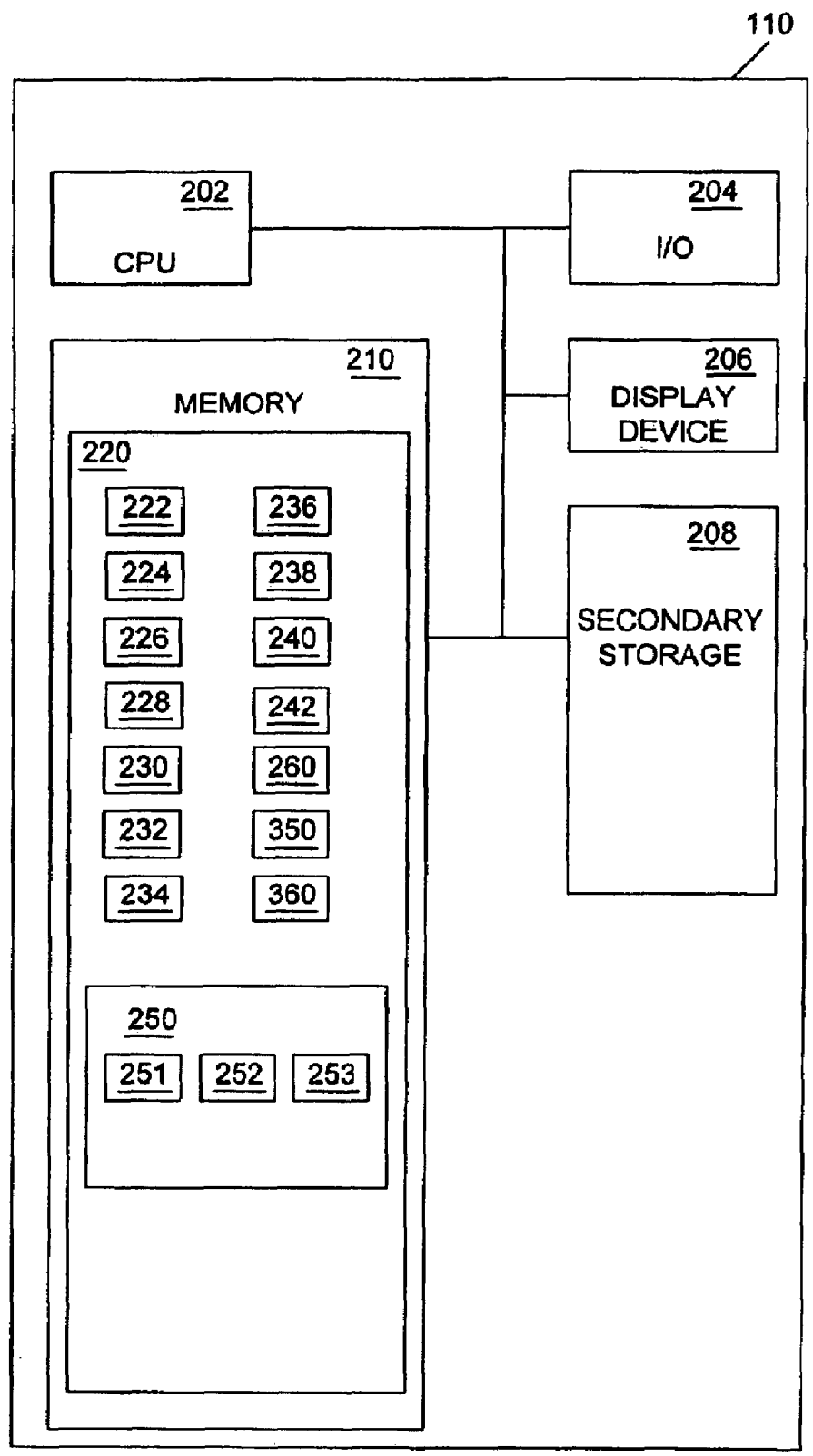
FIG. 2 shows a block diagram of a services data processing system in accordance with methods and systems consistent with the present invention.

FIG. 2 depicts a more detailed view of services system 110. The services system comprises a central processing unit (CPU) 202, an input/output (I/O) unit 204, a display device 206, a secondary storage device 208, and a memory 210. The services system may further comprise standard input devices such as a keyboard, a mouse or a speech processing means (each not illustrated).

Memory 210 contains a program 220, which comprises the following functional blocks for performing exposure detection and risk analysis: a rule deployment manager 222, a fault knowledge enrichment block 224, an exposure state management block 226, an exposure set curve fitting block 228, an exposure set risk calculation block 230, a risk trending block 232, an availability mapping block 234, and an availability outage calculation block 236. Each of these functional blocks will be described briefly immediately below with reference to FIG. 3 and then described in more detail further down in the description. One of skill in the art will appreciate that each functional block can itself be a stand-alone program and can reside in memory on a data processing other than the services system. The program 220 and the functional blocks may comprise or may be included in one or more code sections containing instructions for performing their respective operations. While the program 220 is described as being implemented as software, the present implementation may be implemented as a combination of hardware and software or hardware alone. Also, one having skill in the art will appreciate that the program may comprise or may be included in a data processing device, which may be a client or a server, communicating with services system 110.

Figure 3:
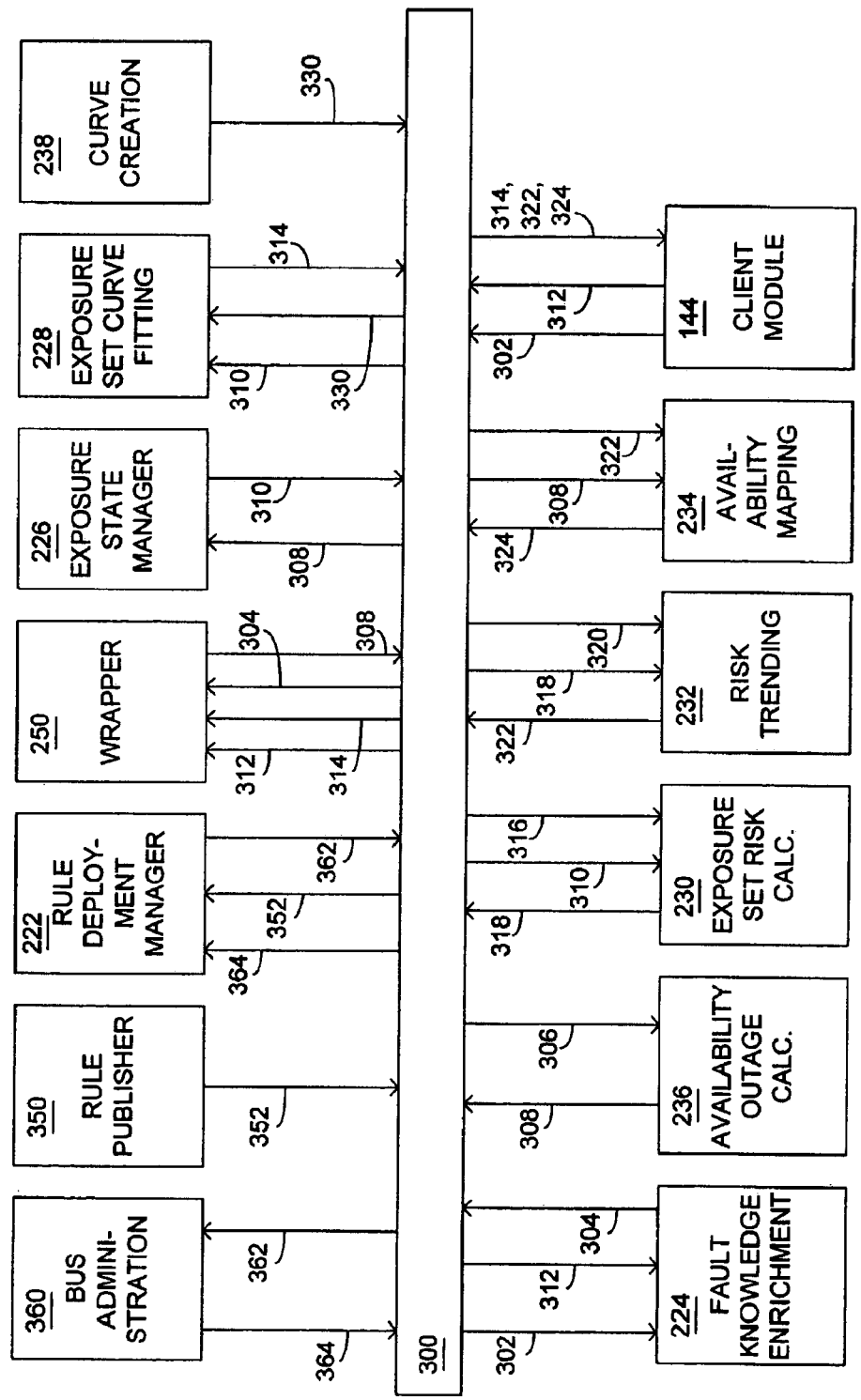
FIG. 3 depicts a block diagram depicting program functional blocks communicating via the bus in accordance with methods and systems consistent with the present invention.

FIG. 3 depicts a block diagram illustrating the support entities, computer programs, and functional blocks that communicate via the bus, as well as the data types to which they subscribe or that they publish. Unlike conventional risk management systems that utilize static rule engines, the exposure detection and risk analysis program consistent with the present invention comprises dynamic rule engines. The rule deployment manager 222 creates at least one wrapper 250 that contains one or more rule engines 251, 252 and 253. Each rule engine operates asynchronously and performs one check based on subscribed-to input data 304, 312 and 314 received via a bus 300. The rule deployment manager can therefore commission or decommission rule engines dynamically in the wrapper without the need for release cycles around rule sets. A more detailed description of a rule engine suitable for use with methods and systems consistent with the present invention is found in U.S. patent application Ser. Nos. 10/135,438, filed May 1, 2002, and 10/318,707, filed Dec. 13, 2002, which are incorporated herein by reference to the extent permitted by law.

If a rule engine check determines that there is a potential problem with a support entity, then the rule engine produces an output (i.e., the rule engine fires). The wrapper publishes an exposure level and a confidence level of the exposure level 308 as outputs based on the rule engine firing. The exposure level is a measure of the importance of the rule firing, which measure corresponds to an exposure to failure of the entity being checked. The confidence value is a measure of how confident the wrapper is that the exposure level is the correct level. For example, if two or more rule engines fired responsive to the same problem the confidence level is higher than if one rule engine fired.

Fault knowledge enrichment block 224 subscribes to hardware and software configuration information 312 and fault information 302, which is captured and published by the client module 144, adds available business logic and knowledge to the fault information, and publishes the knowledge enriched fault information 304. Thus, the fault information received by the rule engines is knowledge enriched, allowing the rule engines to make accurate determinations.

Exposure statement management block 226 is a state machine that manages the current state of the support entities. It subscribes to the exposure and confidence levels 308 and publishes an exposure set 310 when a support entity's exposure or confidence levels change. The exposure set contains all current exposure and confidence levels for each rule that relates to a particular support entity. Accordingly, the exposure set provides a snapshot of a support entity's exposure.

Exposure set curve fitting block 228 subscribes to exposure sets 310 and fits curves onto the exposure sets to determine known patterns in exposure values that match pre-discovered problems. If the exposure set curve fitting block determines that there is a match to a pre-discovered problem, then it publishes a service action 314, which is a notification of the potential problem. This block receives new curves by subscribing to new exposure curves 330 that are created and published by a curve creation editor block 238.

Exposure set risk calculation block 230 analyses exposure sets 310 and calculates a risk level for a support asset that corresponds to an exposure set. This block subscribes to the exposure sets 310 and to risk calculation algorithms 316, which it applies to the exposure sets. Based on the application of the business rules, the exposure set risk calculation block 230 publishes a quantified risk level and probability of being at that risk level 318 for the support asset.

Risk trending block 232 identifies trend information in the risk levels. The risk trending block subscribes to business rule thresholds 320 and the risk level 318, and publishes a service action 322 based on its analysis.

Availability outage block 236 subscribes to customer system availability events 306, and constructs and publishes formatted availability outage information 308. Availability mapping block 234 subscribes to the availability outage information 308 and to the service action 322 from the risk trending block 232, and maps the availability outage information onto the risk trend information. Any matching can increase the probability of a trending problem occurring. The availability mapping block 234 publishes service action 324 based on the matching results.

Each of the above-described functional blocks will be described in more detail below.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system 100 have been described, one skilled in the art will appreciate that a data processing system suitable for use with methods, systems, and articles of manufacture consistent with the present invention may contain additional or different components.

One having skill in the art will appreciate that the services system 110 can itself also be implemented as a client-server data processing system. In that case, the program 220 can be stored on the services system as a client, while some or all of the steps of the processing of the functional blocks described below can be carried out on a remote server, which is accessed by the server over the network. The remote server can comprise components similar to those described above with respect to the server, such as a CPU, an I/O, a memory, a secondary storage, and a display device.

Figure 4:
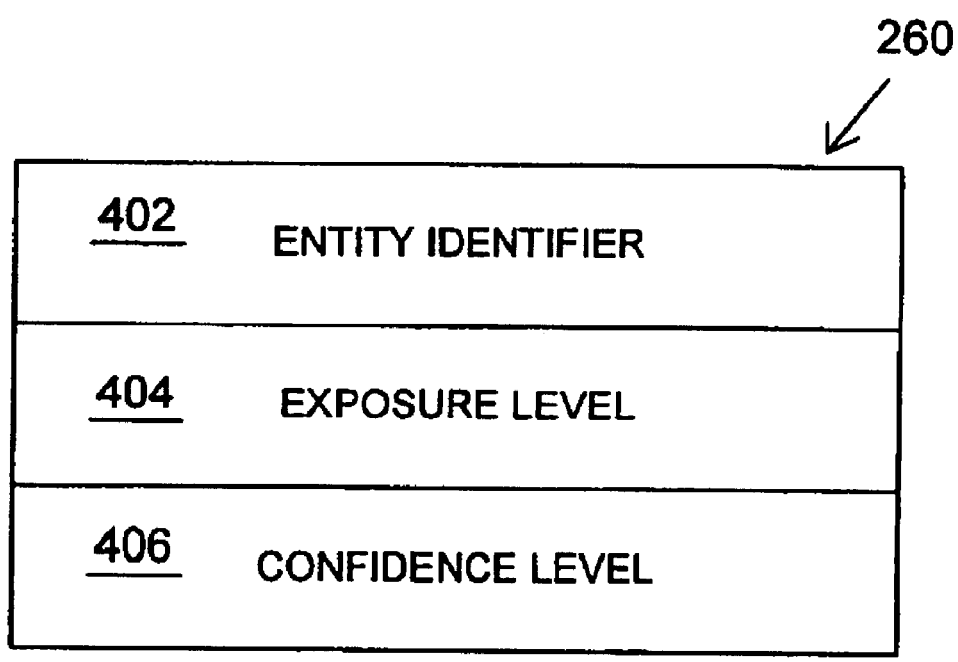
FIG. 4 illustrates a block diagram of a data structure in accordance with methods and systems consistent with the present invention.

The program 220 includes a data structure 260 having an entry reflecting an exposure level to failure of an entity. FIG. 4 depicts a more detailed diagram of the data structure 260. The sample data structure that is depicted in FIG. 4 represents an exposure level datatype output from the wrapper. The data structure comprises an exposure level to failure of the entity 404, a confidence level 406 of the exposure level, and an identifier of the entity 402.

As noted above, functional blocks of the program on the services system subscribe to information and publishes information via the bus 300. The bus is a term used for purposes of this disclosure to described an infrastructure established on the network that provides publish-subscribe capability. In the illustrative example, the bus is the intellectual-capital bus described in U.S. patent application Ser. No. 10/691,039, filed concurrently with this application, for "A Publish-Subscribe System for Intellectual Capital Management," to Michael J. Wookey, Attorney Docket No. 30014200-1117, which is incorporated herein by reference. The bus provides capability for each functional block, regardless of its location on the network, to publish and subscribe to datatypes. One having skill in the art will appreciate that the bus is not limited to the one used in the illustrative example. Another publish-subscribe network infrastructure suitable for use with methods and systems consistent with the present invention can also be implemented. Publish-subscribe network infrastructures are known in the art and will not be described in more detail herein.

Each rule engine runs one rule. A rule is introduced into the data processing system by a rule publisher program 350 that creates the rule 352 and publishes it via the bus as a rule datatype. The rule publisher program runs in the memory of the services system or another device connected to the network. In the illustrative example, the rule publisher runs in a memory of the services system 110. There can be any number of rule publisher programs that can publish rules to the bus from any one of the devices connected to the network.

When a user at the services system 110 wants to generate a rule, the user inputs into the rule publisher program a rule signature, which defines the rule and information describing the rule. The user enters the rule signature, for example, by creating an eXtensible Markup Language (XML) file, which identifies the rule inputs, the rule logic, and the rule outputs. A rule can utilize three classes of inputs: data received via the bus, rule triggers from other rules (this enables the execution of one rule to trigger the execution a subsequent rule), and side effects from other rules. As will be described in more detail below, a rule trigger indicates that a rule has started execution, and a side effect indicates that a side effect occurred in a rule engine.

The rule logic can be, for example, any algorithm, calculation, look-up function, or logic. In the illustrative example, the rule logic in one of the rule engines determines whether a disk driver Y to be used on the customer system is compatible with the customer system hard disk X. To make this determination, the rule logic compares the disk driver type to the customer system hard disk type in an If . . . Then . . . analysis. The rule logic is implemented as: if hard disk X and disk driver Y, then there is a problem. In the illustrative example, there is a problem, therefore the rule engine fires upon completion of execution.

For purposes of the illustrative example, the rule signature comprises the following information in an XML format:
rule name (rule 1)
rule version(1)
rule inputs(hard disk driver type, hard disk type)
rule outputs(fired state, exposure level, confidence level)
rule (IF (hard disk Y) and NOT (hard disk driver Y) THEN (configuration error))

A rule has three possible completed execution states: fired, not-fired, and error. Errors can occur while the rule engine is executing the rule due to, for example, lack of data, coding errors, or rule engine anomalies. Rules that run without error in the rule engine will then take on one of the other two states, fired and not-fired. If a rule exits execution early, it will be in the not-fired state. If the rule runs to completion, it will be in the fired state.

During the course of rule execution, a side effect may occur in the rule engine, such as a fact assertion, a variable setting, or a sub-rule firing. The side effect contains information that could trigger other rules or processing. The user can define the rule signature to request that the wrapper receive and publish one or more of these side effects at the completion of rule execution. The signature can also be defined to indicate whether the side effects should be published on rule fired, rule not-fired, or both, as well as indicate that a lack-of-side-effects message needs to be published if a side effect is not present.

The user can also include an applicability rule in the rule signature in addition to the rule. The applicability rule describes conditions that must be fulfilled before the rule can execute. For example, the applicability rule can fire, effecting execution of the rule, if the customer system is currently supported by the services organization.

Figure 5:
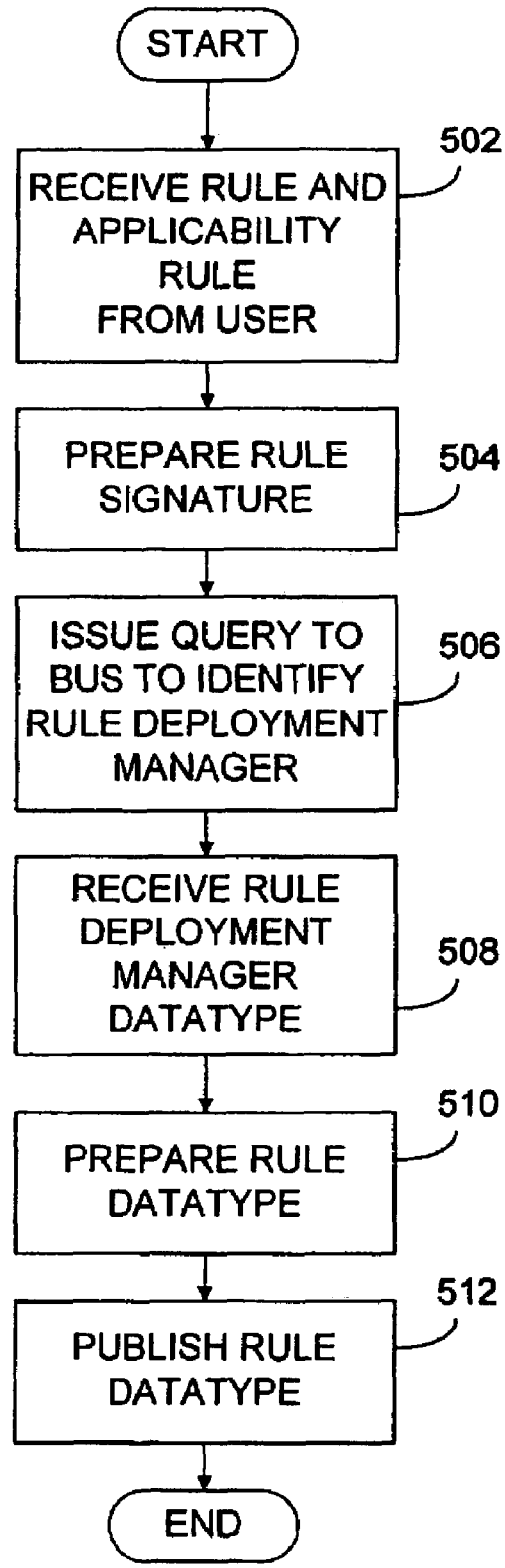
FIG. 5 depicts a flow diagram of the exemplary steps performed by the rule publisher block.

FIG. 5 depicts a flow diagram illustrating the steps performed by the rule publisher program to create and publish a rule data type to the bus. First, the rule publisher program receives user input defining the rule and possibly an applicability rule associated with the rule (step 502). The rule definition comprises the rule name, the rule type, the rule logic, the rule inputs, and the rule outputs. The applicability rule definition comprises the applicability rule logic, the applicability rule inputs, and the applicability rule outputs. Then, the rule publisher program prepares the rule signature based on the received user input received in step 502 (step 504). The rule signature, in the illustrative example, is an XML file including the rule and the applicability rule, if there is one.

After the rule signature is created in step 504, the rule publisher program issues a query message to the bus to identify a rule deployment manager that subscribes to the relevant rule name or rule type (step 506). The query message includes a key identifying the rule name or rule type. The rule type identifies a category of the rule, such as a rule relating to hard disk driver software. A rule deployment manager that subscribes to the key contained in the query message issues a response message including a rule manager datatype, which contains a rule manager key that identifies, to the rule publisher program, the appropriate rule deployment manager to which to route the rule data type. The response message is then received by the rule publisher program (step 508).

The rule publisher program then prepares the rule datatype, which comprises the rule name and rule version as unique keys for bus identification, the rule manager key for deployment routing, and the rule signature (step 510). After the rule datatype is prepared, the rule publisher program publishes the rule datatype to the bus (step 512).

Therefore, rules can be published from any system on the network that runs an instance of the rule publisher program. For example, if a services organization employee is at a customer site and identifies a new problem associated with the customer's system, the services organization employee can publish a new rule to the bus from the customer site using an instance of the rule publisher program running on the customer's system. The new rule datatype is received by an instance of the rule deployment manager, which deploys a corresponding rule engine. Accordingly, the new rule is implemented asynchronously and begins analysing input data network-wide almost instantaneously.

Figure 6:
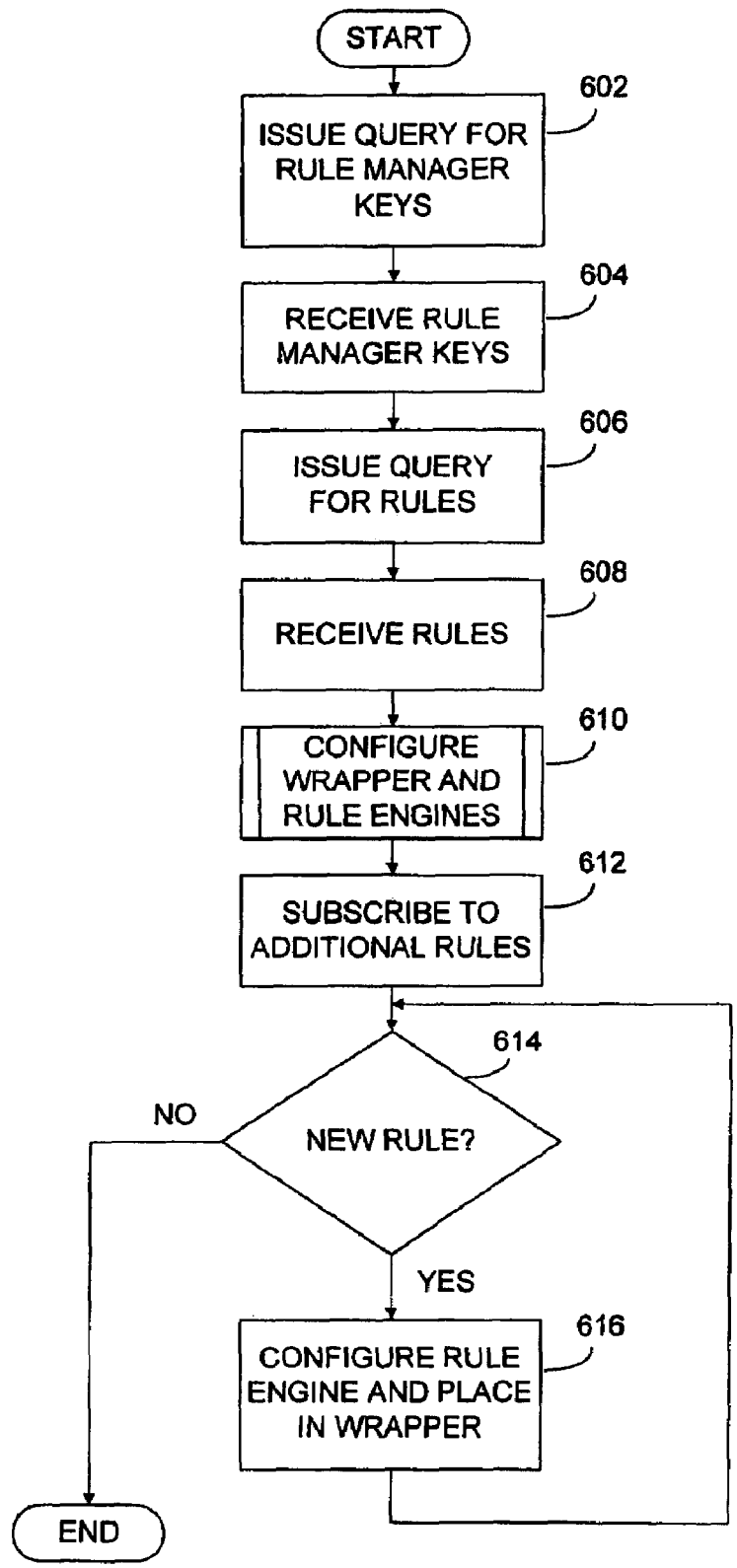
FIG. 6 depicts a flow diagram of the exemplary steps performed by the rule deployment manager block.

The rule deployment manager 222 identified by the rule manager key receives the rule datatype via the bus by subscribing to the rule datatype. To facilitate horizontal scalability, load balancing, and a flexible configuration, there may be multiple rule deployment managers communicating with the bus. FIG. 6 depicts a flow diagram illustrating the steps performed by the rule deployment manager for deploying the wrapper, which includes one or more rule engines. Although the illustrative example describes one wrapper, a plurality of wrappers can be implemented simultaneously, with each wrapper having independent rule engines. Referring to FIG. 6, when the rule deployment manager first starts, it knows its name but is not cognizant of other information. First, the rule deployment manager issues a query (shown as item 362 in FIG. 3) to the bus requesting the one or more rule manager keys that will act as filters for the rules to which it will subscribe (step 602). The query includes the name of the rule deployment manager. Responsive to the rule deployment manager's query, a bus administrator program 360 publishes a response message (shown as item 364 in FIG. 3) including the rule manager keys that correspond to the name of the rule deployment manager. The bus administrator program does this by looking to a lookup table for the appropriate rule manager keys that correspond to the rule deployment manager name. The bus administrator program keeps a lookup table of devices and functional blocks communicating via the bus. The bus administrator program subscribes to queries for keys and publishes the corresponding keys responsive to the identity of the issuer of the query.

The rule deployment manager then receives the response message, which includes the rule manager keys (step 604). After the rule deployment manager has the rule manager keys, it issues another query to the bus requesting existing rules from other rule deployment manager instantiations (step 606). The query is received by any other instantiated rule deployment managers, which responsively send a response including zero or more rule datatypes that they manage. Using its assigned rule manager keys to filter the responses so as to only receive rules matching its rule manager key set, the rule deployment manager receives its rules (step 608).

Figure 7:
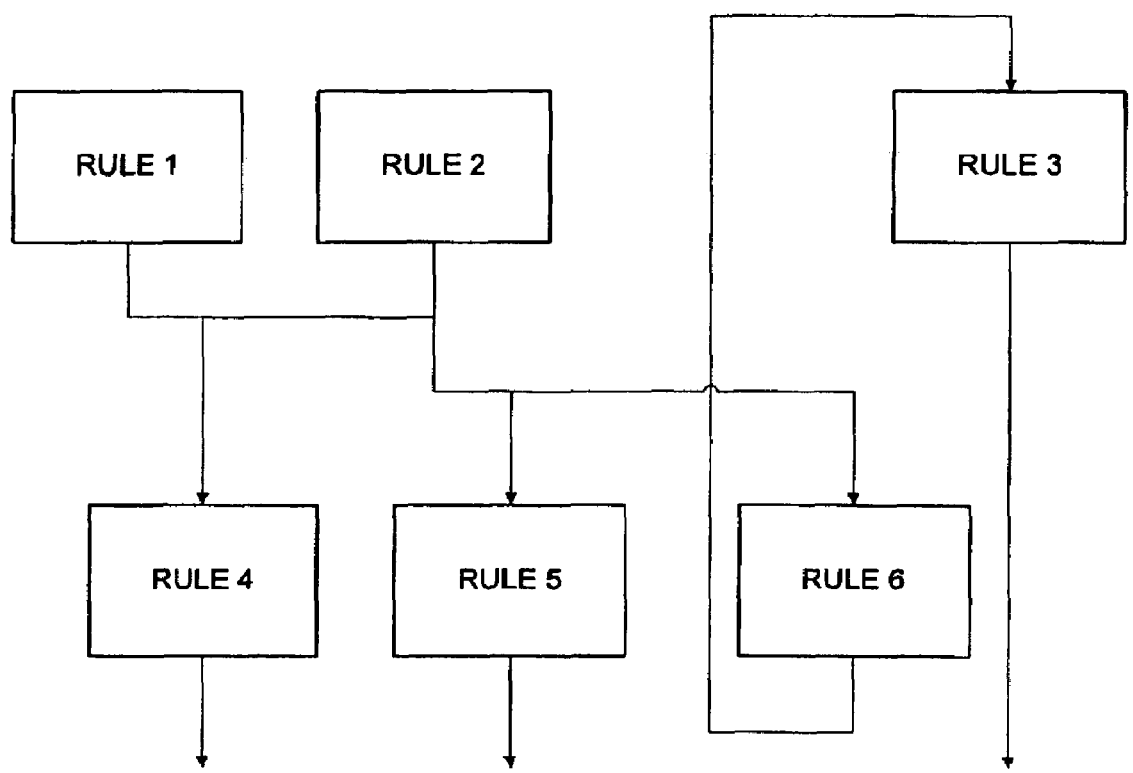
FIG. 7 depicts a block diagram of horizontal scaling of rules.

Then, the rule deployment manager configures a rule engine instance for each rule and places a wrapper around the rule engines (step 610). The wrapper provides an integration interface to the bus that the rule engine will need to fulfill the rule. As described above, each instance of the rule engine runs one rule and is instantiated when the interface described in the wrapper is fulfilled. This model provides for the dynamic commissioning of new rules without the need for release cycles around rule sets. Further, rules fire asynchronously as data to which they subscribe becomes available. Since rules can fire other rules, methods and systems consistent with the present invention provide for horizontal scaling of rules. An illustrative example of an execution map of rule firings is shown in FIG. 7.

Figure 8:
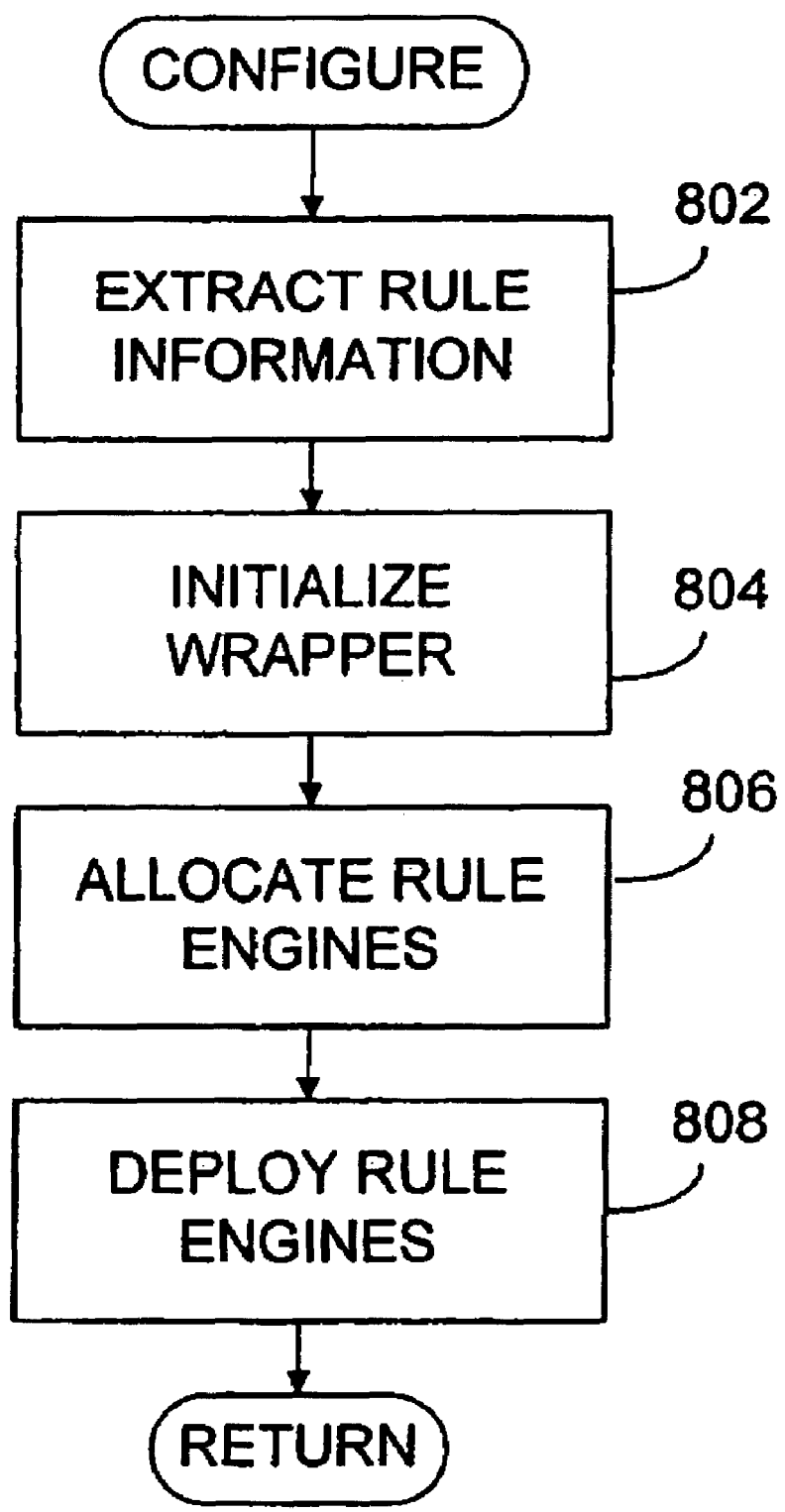
FIG. 8 shows a flow diagram of the exemplary steps performed by the rule deployment manager for initializing the wrapper and deploying the rule engines.

Referring to FIG. 8, FIG. 8 depicts a more detailed view of step 610 for illustrating the steps performed by the rule deployment manager for initializing the wrapper and deploying the rule engines contained in the wrapper. In FIG. 8, first, the rule deployment manager extracts the rule and information about the rule from the rule signature, which has been received from the rule publisher (step 802). As described above, the rule signature is an XML file that identifies the inputs and outputs of the rule, as well as the rule itself. In the illustrative example, the rule deployment manager extracts the following information from the illustrative rule signature:

rule name: rule 1
rule version: 1
rule inputs: hard disk driver type, hard disk type
rule outputs: fired state, exposure level, confidence level
rule: IF (hard disk X) and (hard disk driver Y) THEN (configuration error)

Then, the rule deployment manager initializes the wrapper (step 804). The initialization of wrappers, in general, is known to one having skill in the art and will not be described in greater detail herein. The wrapper consistent with the present invention is responsible for semantic validation of the rule information contained in the rule signature and for providing an interface between the rule and the bus. With respect to semantic validation, the wrapper validates, for example, proper rule inputs, joining of rule inputs, and proper rule outputs.

A rule input is received by a rule by the wrapper, which subscribes to input data pertinent to the rule and passes the input data to the rule's rule engine. Similarly, once a rule engine generates an output, the wrapper publishes the output to the bus.

As described above, rules receive different types of inputs, such as input data received from the bus, rule triggers, and rule side effects. The wrapper uses a subscription model for joining related inputs as defined in the rule signature. For example, a plurality of input data that relates to a particular host or asset group is joined for delivery to a relevant rule engine. These input data relationships are defined by, for example, relationship maps, latch maps, and historical retrieval maps. The wrapper uses the relationship map to determine which inputs are joined to fulfill the rule inputs described in the rule signature, including any filters. A latch map is maintained to determine which inputs have been received, and therefore latched, and a waiting period associated with the maintenance of the latches. If the wrapper receives a rule trigger as an input, and has not received other inputs required by a rule, the wrapper can retrieve other inputs from a historical database, such as a database stored on storage 160, or continue processing with any latched inputs that have been received. All of this information allows the wrapper to fulfill the input data requirements for a rule without the rule's rule engine being aware of how the data arrived.

As described above, the rule signature can comprise an applicability rule associated with a rule. If an applicability rule is present in the signature, the specification of the inputs to the wrapper is a superset required to execute both the applicability rule and the rule.

On the output side, once an engine has completed processing the rule, the wrapper is responsible for capturing the execution state of the rule and rule engine, and publishing the information as designated by the rule signature to the bus. A rule can have three possible execution states: fired, not-fired, and error. The wrapper publishes one of these execution states at a rule's completion of execution. If an error is detected by the engine, the wrapper captures the error and publishes the error to the bus as a rule error datatype. The rule error datatype includes, for example, the rule name, the rule version, the relevant host/asset group, and the date and time of the error. Further, the rule error datatype contains a field for error data describing the error.

If a rule exits early, it is in the not-fired state, and the wrapper publishes a rule fired datatype with a field indicating that the fired state is set to false, and with no other fields present. The rule fired datatype includes, for example, the rule name, rule version, the relevant host/asset group, and the date and time of the fired/not-fired state.

If a rule runs to completion, it is in the fired state, and the wrapper publishes a rule fired datatype with the fired state field set to true. Additionally, the wrapper populates an exposure level field and a confidence level field of the rule fired datatype responsive to information from the rule signature. Exposure level is a measure of the importance of the rule firing, where a high level of exposure suggests that a rule has detected a serious problem with the entity. The exposure level has a range, for example, of 0-100 with 100 being the highest exposure. The exposure level assigned by the wrapper for a rule engine firing is predetermined by a parameter set forth in the rule signature. Just because a rule engine outputs an exposure level of 100 does not mean that the entity has a serious problem.

To assist with determining exposure to failure, a confidence level also output. The confidence level is a measure of confidence that the exposure level is the correct level. The confidence level has a range, for example, of 0-1, with a level of zero indicating no confidence that the exposure level is correct, and a level of 1 indicating complete confidence that the exposure level is correct. The confidence level is determined based on parameters set forth in the rule signature. For example, the rule signature may provide that if a first rule and a second rule, which each relate to a same problem, each fire then there is a confidence level of 1 in a range of 0-1.

Therefore, the wrapper itself does not apply a meaning to the exposure level and confidence level fields, it just publishes them responsive to the rule signature upon a rule firing. The interpretation of these fields is left to the rule signature developers and any downstream processing that utilizes the rule fired datatype.

During the course of rule execution, a side effect may occur in the rule engine, such as a fact assertion, a variable setting, or a sub-rule firing. These side effects contain information that the wrapper could use to trigger other rules or processing. For example, the rule signature may designate that the wrapper pick up and publish one or more of these side effects at the completion of a rule execution. Further, the rule signature may indicate whether the wrapper should publish the side effect on rule fired, rule not-fired, or both, as well as designating whether a lack-of-side-effect message should be published if a side effect is not present. In the latter case, another rule or processor may want to trigger on the fact that a side effect did not occur. When publishing a side effect, the wrapper publishes a side effect datatype. The side effect datatype contains the rule name, rule version, the relevant host/asset group, and the date and time of the side effect. Also, the side effect datatype contains a field including data about the side effect.

If there is an applicability rule associated with a rule, the wrapper sets up the rule engine to execute the applicability rule prior to executing the rule. On an applicability rule error, the wrapper publishes the error. If the applicability rule does not fire, the wrapper acts as if the input data conditions required by the rule have not been satisfied and does not execute the rule. If the applicability rule fires, then the rule begins execution.

One having skill in the art will appreciate that rules can have inputs and outputs other than those described above, and that the datatypes can have other fields.

Referring back to FIG. 8, after the rule deployment manager initializes the wrapper in step 804, it instantiates a rule engine for each rule within the wrapper (step 806). Then, the rule deployment manager deploys each rule engine (step 808). Deploying the rule engines means that the instantiated rule engines are enabled for performing their processing. Upon deployment, the rule engines may receive inputs, process their rule, and provide an output.

Referring back to FIG. 6, after the rule deployment manager implements the wrapper and deploys the rule engines in step 610, the rule deployment manager subscribes to any new rule datatypes that are destined for this particular rule deployment manager (step 612). Similar to step 608, in step 610, the rule deployment manager uses its rule manager keys as a filter to subscribe to those rules, which are sent out by rule publishers, that are destined for this particular rule deployment manager. Then, the rule deployment manager determines whether it has received a new rule (step 614). If it has received a new rule, then the rule deployment manager configures a rule engine for the rule and deploys the rule engine within the wrapper, as described above in step 610 (step 616).

Figure 9:
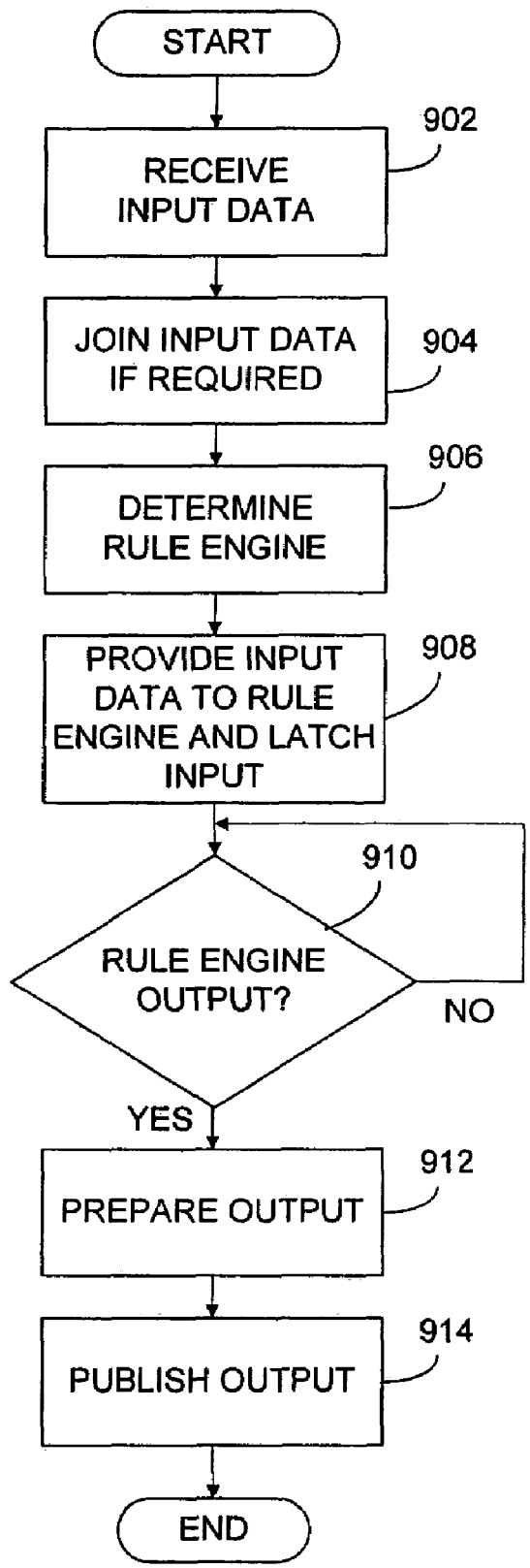
FIG. 9 shows a flow diagram of the exemplary steps performed by the wrapper.

FIG. 9 shows a flow diagram illustrating the steps performed by the wrapper after the wrapper has been initialized and its one or more rules have been deployed by the rule deployment manager. In FIG. 9, the wrapper first receives from the bus a data input to which it has subscribed (step 902). As described above, the wrapper is configured to subscribe to data inputs as defined by the rule signatures for the rules that are contained in the wrapper. These data inputs can be bus data (e.g., faults or configuration data about an entity), rule triggers, or rule side effects. If the wrapper's associated rule signatures defined that the input data should be joined with other received input data, then the wrapper joins the input data (step 904). For example, the wrapper may have been initialized such that it joins input data relating to device status for all devices belonging to a particular asset group. In performing the join, the wrapper can utilize any relationship maps, latch maps, and historical retrieval maps that it has been designated to use during the wrapper's initialization. These maps are stored, for example, in the memory of the services system or in the secondary storage.

After performing any required join in step 904, the wrapper determines the appropriate rule engine to which it will provide the input data (step 906). This is performed, for example, by looking up, in a lookup table, the appropriate rule engine that corresponds to the input data. The wrapper then provides the input data to the rule engine and latches the input data as having been received (step 908). By activating a latch for an input data, which identifies when the input data was received by the wrapper, this latching information can be used to determine how long it has been since the same type of input data was last received. For example, if a newly received input data is more timely than a previously received input data of the same type, then the newly received input data may be more relevant for determining an exposure.

Then, the wrapper waits for the rule engine to produce an output (step 910). If the wrapper receives an output from the rule engine in step 910, then the wrapper prepares the output for publication (step 912). As described above, the rule engine can provide outputs for rule fired, rule not-fired, rule error, and side effect. The wrapper prepares a datatype corresponding to one of these rule outputs, and populates the datatype's values and fields. For example, if the rule engine outputs that its rule has fired, then the wrapper prepares a rule fired datatype, and populates the datatype with the rule name, rule version, host/asset group, date and time the rule fired, the fired state, the exposure level, and the confidence level. The rule name, rule version, host/asset group, and date and time are known to the wrapper, while the fired state is provided by the rule engine. The wrapper determines the exposure level as a value from 1 to 100 as defined by the rule signature. Also, the wrapper determines the confidence level as a value from 0 to 1, based on whether related rules have also fired within a predetermined period of time. For example, if the rule fired and the same rule or another rule relating to the same asset group also fired within the past week, then the wrapper assigns a confidence level of 1. After the wrapper prepares the output datatype in step 912, it publishes the datatype to the bus (step 914).

Figure 10:
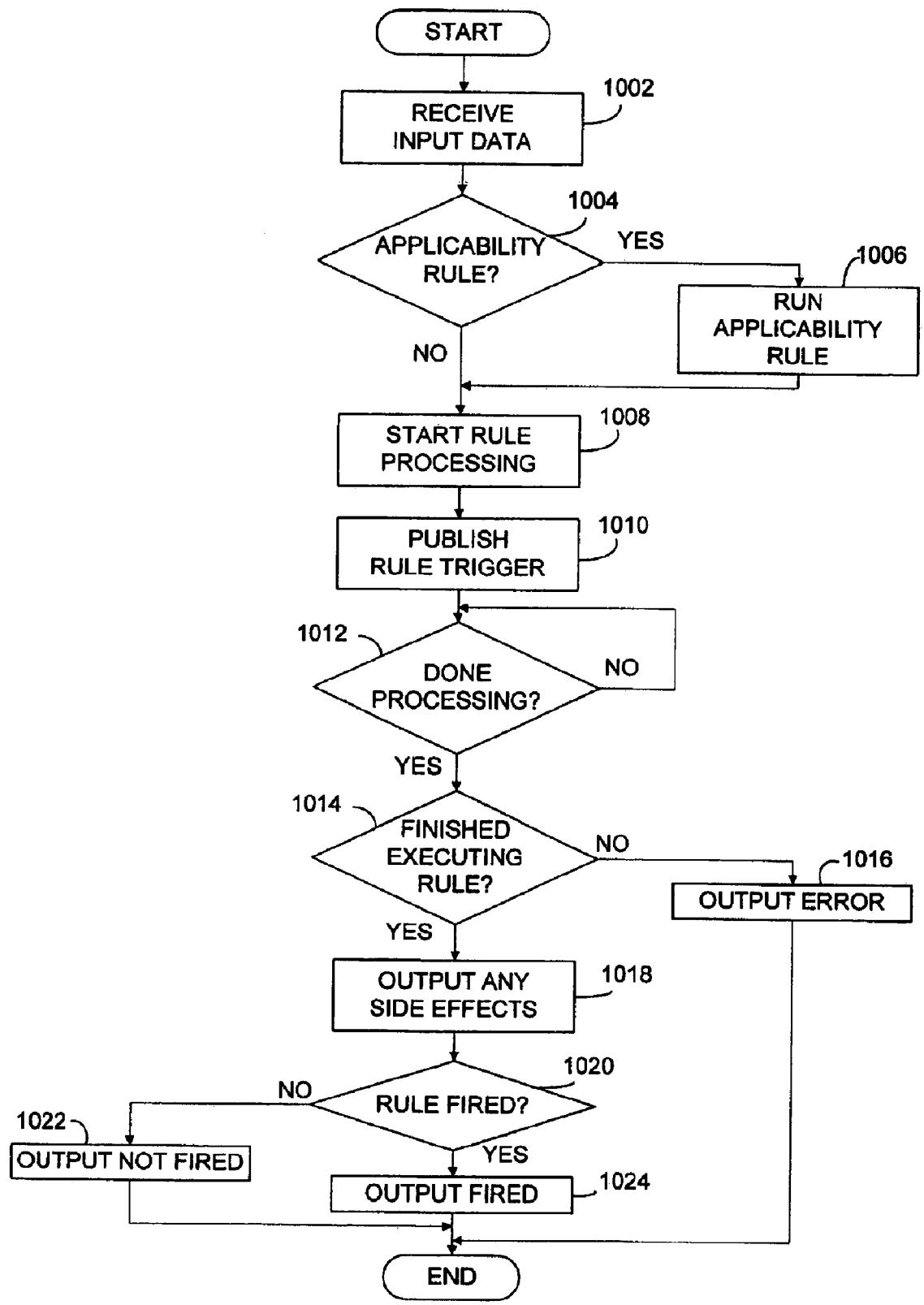
FIG. 10 shows a flow diagram of the exemplary steps performed by a rule engine.

Referring to FIG. 10, FIG. 10 shows a flow diagram illustrating the steps performed by the rule engine after its deployment by the rule deployment manager. First, the rule engine receives input data from the wrapper (step 1002). Then, the rule engine determines whether there is an applicability rule associated with the rule (step 1004). If there is an applicability rule, the rule engine executes the applicability rule first, before executing the rule (step 1006). If there is no applicability rule as determined in step 1004, or after the applicability rule has completed processing in step 1006, then the rule engine starts the rule's execution (step 1008). The rule executes by performing the logic within the rule based on the received data input. In the illustrative example, the rule receives input data including configuration data for the customer system that identifies that the customer system has hard disk driver Y and hard disk X. Accordingly, based on the rule "IF (hard disk X) and (hard disk driver Y) THEN (configuration error)", the rule fires indicating a configuration error. Further, after the rule starts execution, the rule engine publishes a rule trigger to indicate that the rule has started execution (step 1010).

When the rule engine determines that the rule has completed processing in step 1012, the rule engine then determines whether the rule finished executing (step 1014). In other words, the rule engine determines whether the rule has arrived at a fired or not-fired state. If the rule engine determines in step 1014 that the rule has not finished executing, then the rule engine outputs an error (step 1016). If the rule engine determines in step 1014 that the rule has finished executing, then the rule engine outputs any side effects from the rule (step 1018).

After outputting the side effects, the rule engine determines whether the rule fired (step 1020). If the rule did not fire, then the rule engine outputs that the rule is in the not-fired state (step 1022). If the rule fired, then the rule engine outputs that the rule is in the fired state (step 1024).

One of the datatypes to which a rule engine can subscribe is the knowledge enriched fault datatype. Faults and entity configuration data are captured by the client module, which resides for example at the customer system. The capture of faults and their publication is known to one having skill in the art and will not be described in more detail herein. The client module also captures and publishes entity configuration data, for example, by observing changes in the registry of the customer system. Each fault that is published via the bus has a type identifier, which is a classification of that fault. For example, the type identifier can identify a system failure, a driver conflict, or version conflict. The services organization can learn more about faults and their relationship to other faults over the lifetime of a product. To assist with this understanding, the fault knowledge enrichment block binds the latest services organization's knowledge, which has been published to the bus, to a received fault datatype having a matching type identifier. Then, the fault knowledge enrichment block publishes the knowledge enriched fault datatype to the bus, where it can be subscribed to by a rule engine.

Figure 11:
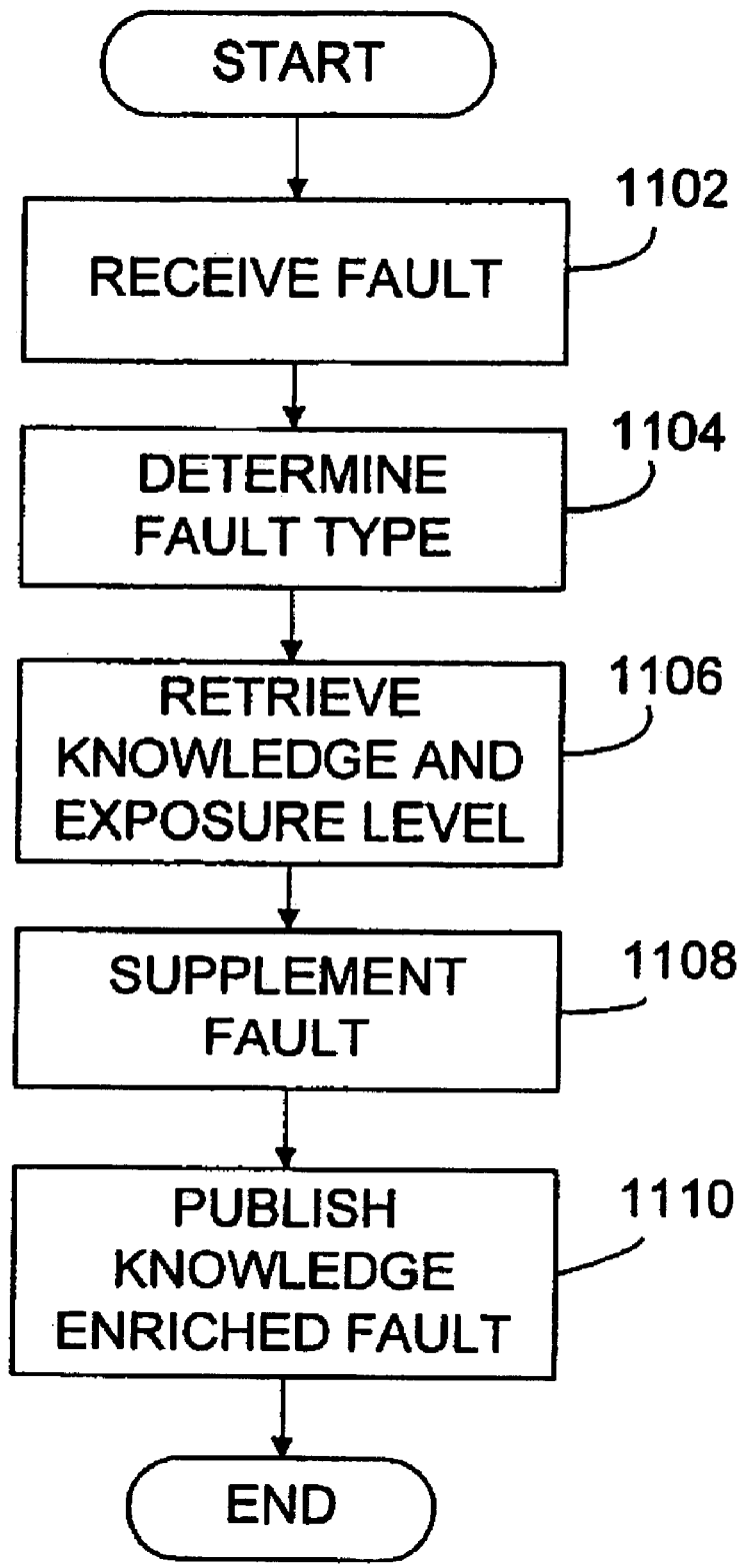
FIG. 11 illustrates a flow diagram of the exemplary steps performed by the knowledge enrichment block.

Referring to FIG. 11, this figure depicts a flow diagram of the illustrative steps performed by the fault knowledge enrichment block. In FIG. 11, the fault knowledge enrichment block first receives a fault datatype to which it has subscribed (step 1102). The fault datatype includes a type identifier, which is read by the fault knowledge enrichment block to determine the fault type (step 1104). Knowing the type identifier, the fault knowledge enrichment block retrieves, from the services system secondary storage, any stored knowledge or exposure levels that are also identified by that type identifier. For example, if a services person previously encountered a problem using hard disk driver Y with hard disk X, the services person may have published information on the bus that identifies the problem. The fault knowledge enrichment block would have subscribed to that publication and stored the report on the services system secondary storage classified by its type identifier.

Then, the fault knowledge enrichment block retrieves any stored knowledge or exposure levels classified by the same type identifier as the fault (step 1106). If any stored knowledge or exposure levels are retrieved, then the fault knowledge enrichment block supplements, or knowledge enriches, the fault by adding the knowledge or exposures levels as fields in the fault datatype (step 1108). After the fault is knowledge enriched, the fault knowledge enrichment block publishes the knowledge enriched fault to the bus (step 1110). The published knowledge enriched fault is received, for example, by a rule engine, where it is used for a rule processing.

The exposure state management block 226 operates as a state machine that manages the states of all rules that have fired for each entity, such as, each support asset or asset group. Each fired rule is associated with an exposure value. The exposure state management block can therefore maintain an exposure set for each entity, where an exposure set is the group of exposure and confidence values resulting from each fired rule for a particular entity. When any exposure or confidence value changes for an entity, the exposure state management block then publishes the entire updated exposure set for that entity. Thus, the exposure state management block continually notifies the bus of changes in exposure or confidence values for each support asset and asset group.

Figure 12:
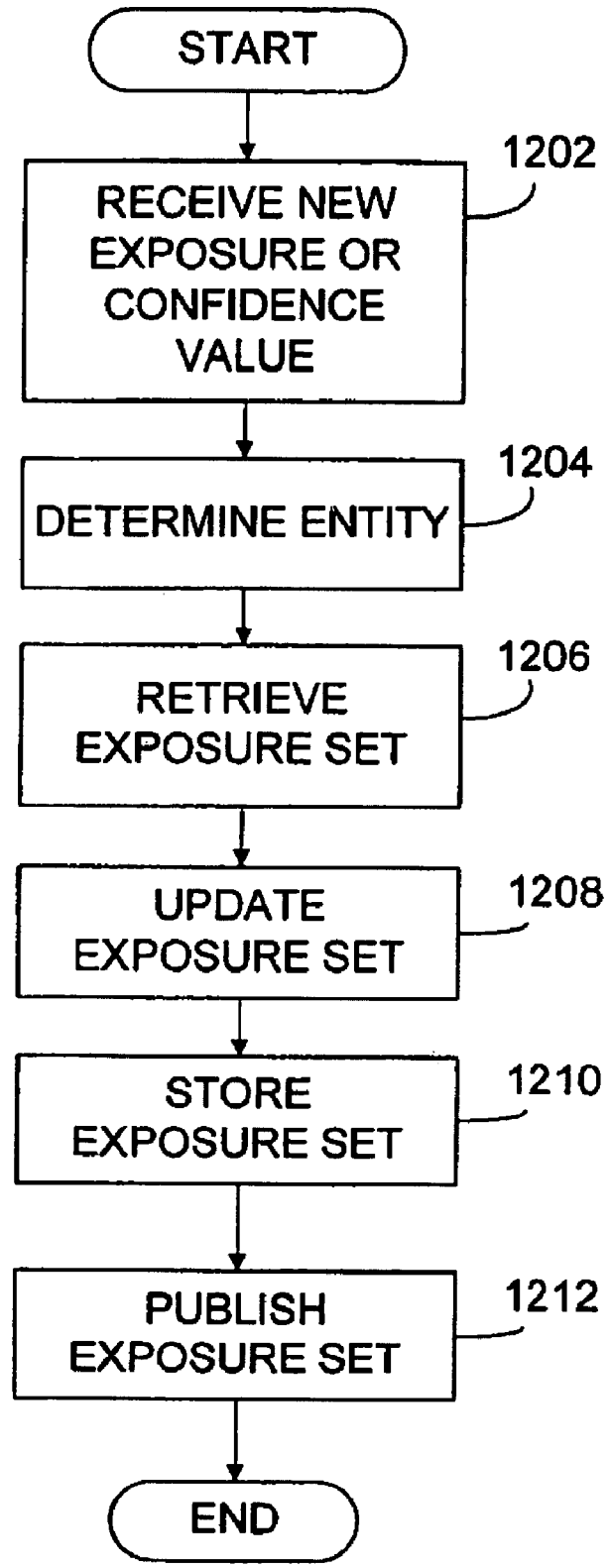
FIG. 12 shows a flow diagram of the exemplary steps performed by the exposure state manager block.

FIG. 12 depicts a flow diagram of the steps performed by the exposure state management block. In FIG. 12, first, the exposure state management block receives a new exposure or confidence value via the bus (step 1202). To do this, the exposure state management block subscribes to the rule fired datatype. Upon receipt of a rule fired datatype, the exposure state management block reads the exposure level field, the confidence level field, and the asset/asset group key from the rule fired datatype. Based on the asset/asset group key, the exposure state management block identifies the relevant support asset or asset group (step 1204), and then retrieves the current exposure set for that support asset or asset group (step 1206). The exposure state management block retrieves the exposure set from, for example, the services system secondary storage.

The exposure set's data structure includes, for example, the support asset/group asset name and an array having values for each relevant rule name and the rule's corresponding exposure value and confidence value. An illustrative example of an exposure set for a support asset is shown below:

| | Support Asset id | |
|---|---|---|
| Rule id 1 | Exposure value | Confidence value |
| Rule id 2 | Exposure value | Confidence value |

One having skill in the art will appreciate that the exposure set can have additional table entries for additional rules or additional values. Once the exposure set is retrieved, the exposure state management block either updates the exposure and confidence values corresponding to a rule existing in the exposure set or adds a new entry with a new rule and its corresponding exposure and confidence values (step 1208). Then, the exposure state management block stores the updated exposure set in the secondary storage (step 1210), and then publishes the updated exposure set to the bus as an exposure set datatype (step 1212).

Figure 13:
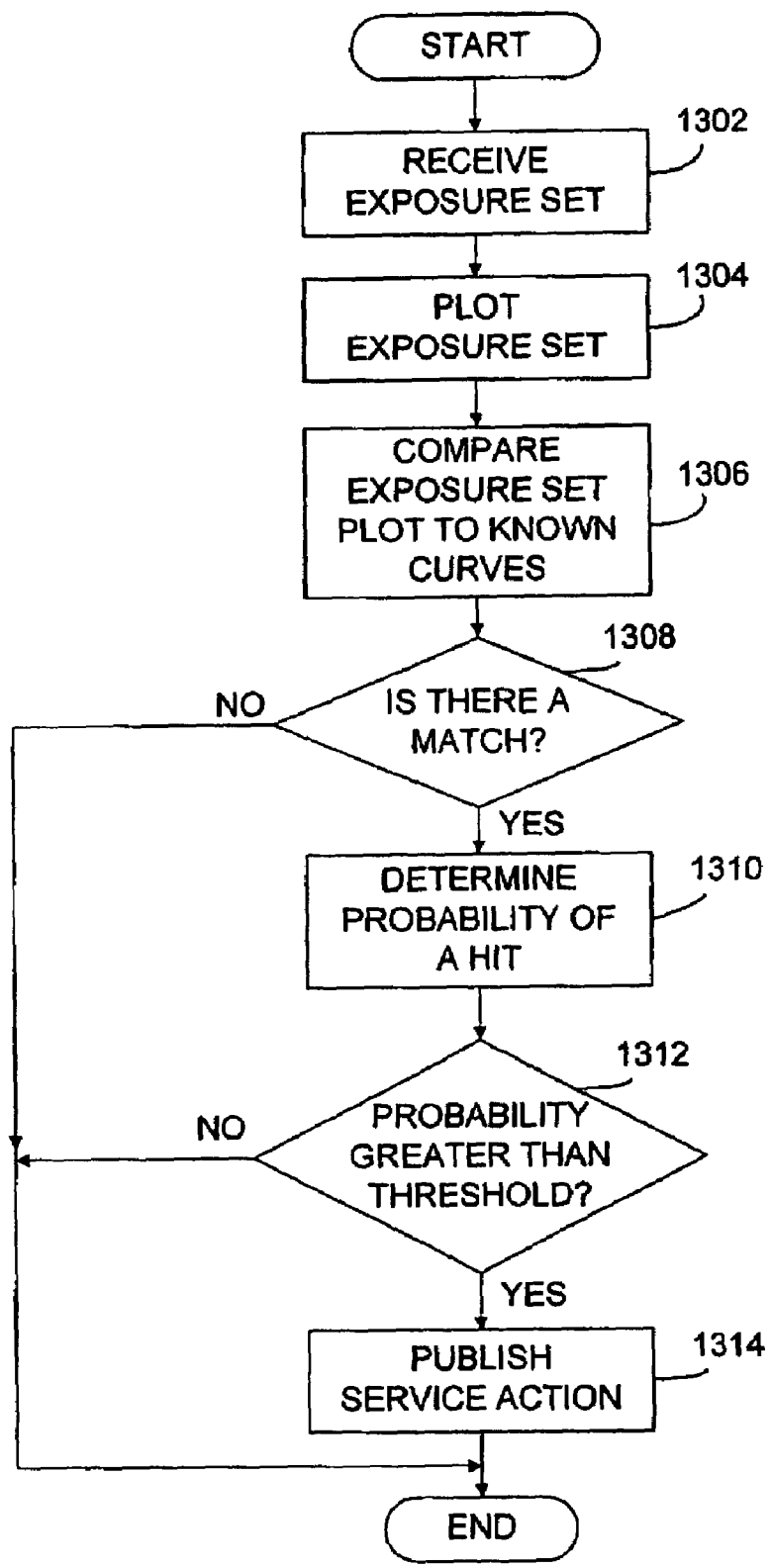
FIG. 13 shows a flow diagram of the exemplary steps performed by the exposure set curve fitting block.

The exposure set can be used by downstream processing. For example, the exposure set curve fitting block 228 fits known problem-related exposure plotted curves onto exposure sets and assesses with a probability if a known problem has occurred or is about to occur. FIG. 13 depicts a block diagram illustrating the steps performed by the exposure set curve fitting block for analyzing a received exposure set. In FIG. 13, first, the exposure set curve fitting block receives an exposure set via the bus (step 1302). To receive the exposure set, the exposure set curve fitting block subscribes to the exposure set datatype. Then, the exposure set curve fitting block plots a curve data set comprising the (exposure level*confidence level) for each rule in the exposure set (step 1304).

Once the exposure set plot is generated, the exposure set curve fitting block compares the plot to known curves (step 1306). To do this, the exposure set curve fitting block retrieves known curves, one at a time, from the services system secondary storage, and executes a numerical curve fitting algorithm to look for matching problem curves. Numerical curve fitting algorithms are known to one having skill in the art and will not be described in greater detail herein. If the exposure set curve fitting block determines that there is a match between the exposure set curve and one of the known curves (step 1308), then the exposure set curve fitting block calculates a probability that the match presents a potential problem (step 1310). The probability has a value from 0 to 100 based on how close the exposure set curve matches the known curve. If the exposure set curve has no points that match the points of the known curve, then the probability of a hit is 0. However, if each point of the exposure set curve matches each point of the known curve, then the probability is 100.

The exposure set curve fitting block then compares the calculated probability to a predetermined threshold to determine whether the probability has a great enough value to cause concern (step 1312). For example, if the probability has a value greater than a threshold value of 80 percent in step 1312, then the exposure set curve fitting block determines that there is a likely a problem and publishes a service action to the bus (step 1314). Each known curve has a service action associated with the known curve, which service action is a message that provides a textual description of the problem and an identifier of the problem. Since the exposure set curve fitting block knows the identity of the known curve, it retrieves the corresponding service action from the secondary storage and publishes the service action to the bus. Therefore, the services organization can asynchronously identify if a problem has occurred or is about to occur based on historical trends.

New curves are inputted into the system using a curve creation editor block 238, which is located in the memory of the services system. Alternatively, the curve creation editor block can be located in the memory of another device on the network. The curve creation editor block can be used, for example, to create new known curves for problems that are identified outside of the realm of the exposure set curve fitting block process. For example, if a services person identifies a services problem that is associated with an exposure set for a certain support asset, the services person can use the curve creation editor block to generate a new known curve that can be used in the future by the exposure set curve fitting block. At the time that the services person generates the new known curve, the services person can also create a service action corresponding to the new known curve.

Figure 14:
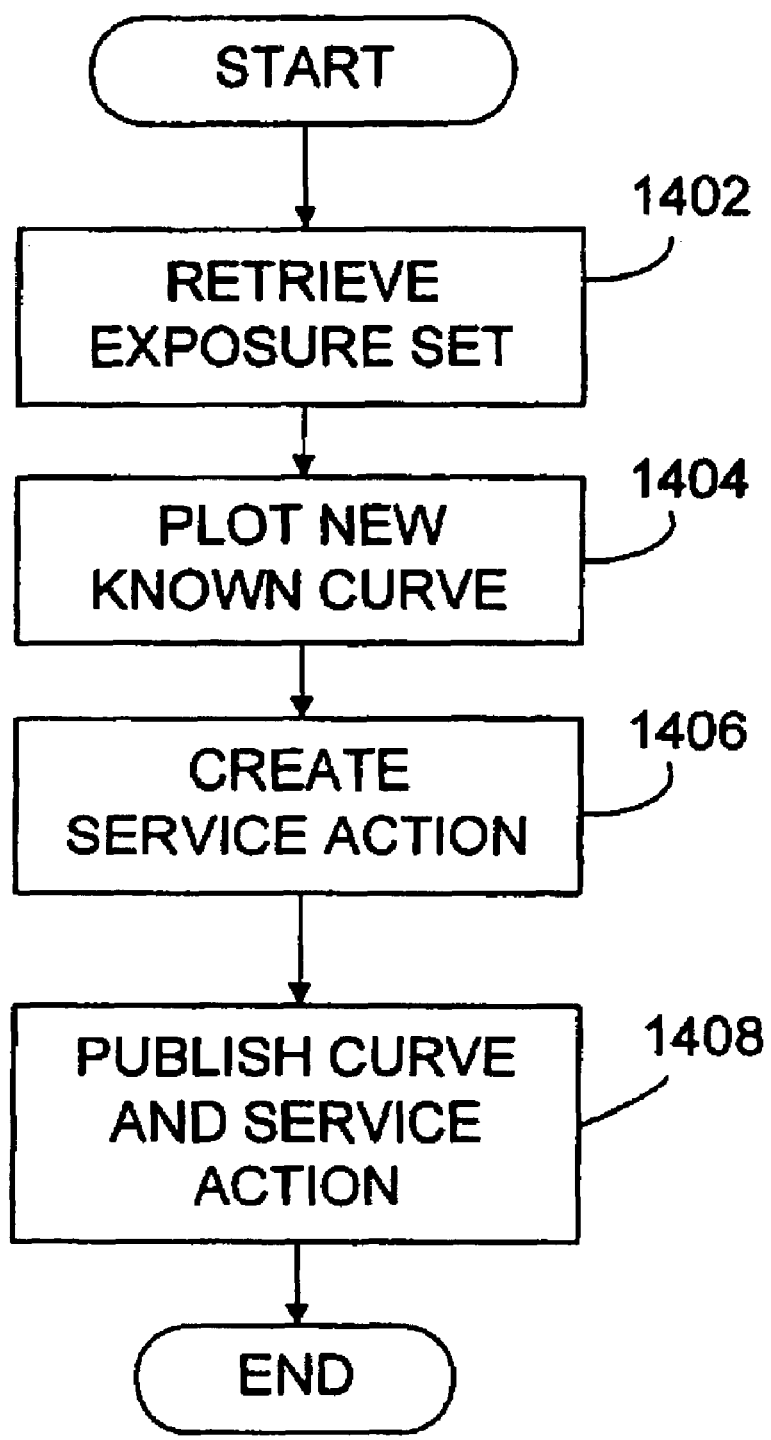
FIG. 14 illustrates a flow diagram of the exemplary steps performed by the curve creation editor block.

FIG. 14 shows a flow diagram of the steps of the curve creation editor block for generating a new known curve and service action. In FIG. 14, the curve creation editor block first retrieves an exposure set that identifies a problem with a support asset (step 1402). The exposure set is retrieved from the secondary storage of the services system or from another source. Then, the curve creation editor block converts the exposure set into a new known curve data set with the (exposure level*confidence level) for each rule in the exposure set (step 1404). Once the curve data set is created, the user inputs a service action to be associated with the new known curve (step 1406). As stated above, the service action includes an identifier of the problem and a textual description of the problem associated with the known curve. For example, the service action can identify the problem as an incorrect hard disk driver type and provide a textual description that states that there is a compatibility issue with the hard disk driver that can lead to a hard disk drive failure.

The curve creation editor block then publishes the new known curve with its service action in a new curve datatype to the bus (step 1408). The exposure set curve fitting block receives the new curve datatype by subscribing to the datatype and stores the new known curve and its service action in the secondary storage of the services system for future use.

In addition to managing exposure to failure of computer-based systems, methods and systems consistent with the present invention also manage the risk of failure. The exposure set risk calculation block calculates a risk level for an entity (i.e., a support asset or asset group) based on an exposure set for that entity. This block takes a risk calculation algorithm and applies it to the exposure set, and publishes the risk level and probability of being at that risk level. The risk calculation algorithm is received in a risk calculation algorithm datatype to which the exposure set risk calculation block subscribes, and is used until a new algorithm is received. Therefore, the algorithm can be revised and improved over time.

The risk calculation datatype is created and published to the bus using a risk calculation editor block 242. The risk calculation editor block receives user input including the risk calculation algorithm and creates the risk calculation datatype, which includes an identifier and risk calculation algorithm. Then, the risk calculation editor block publishes the risk calculation algorithm datatype to the bus.

Figure 15:
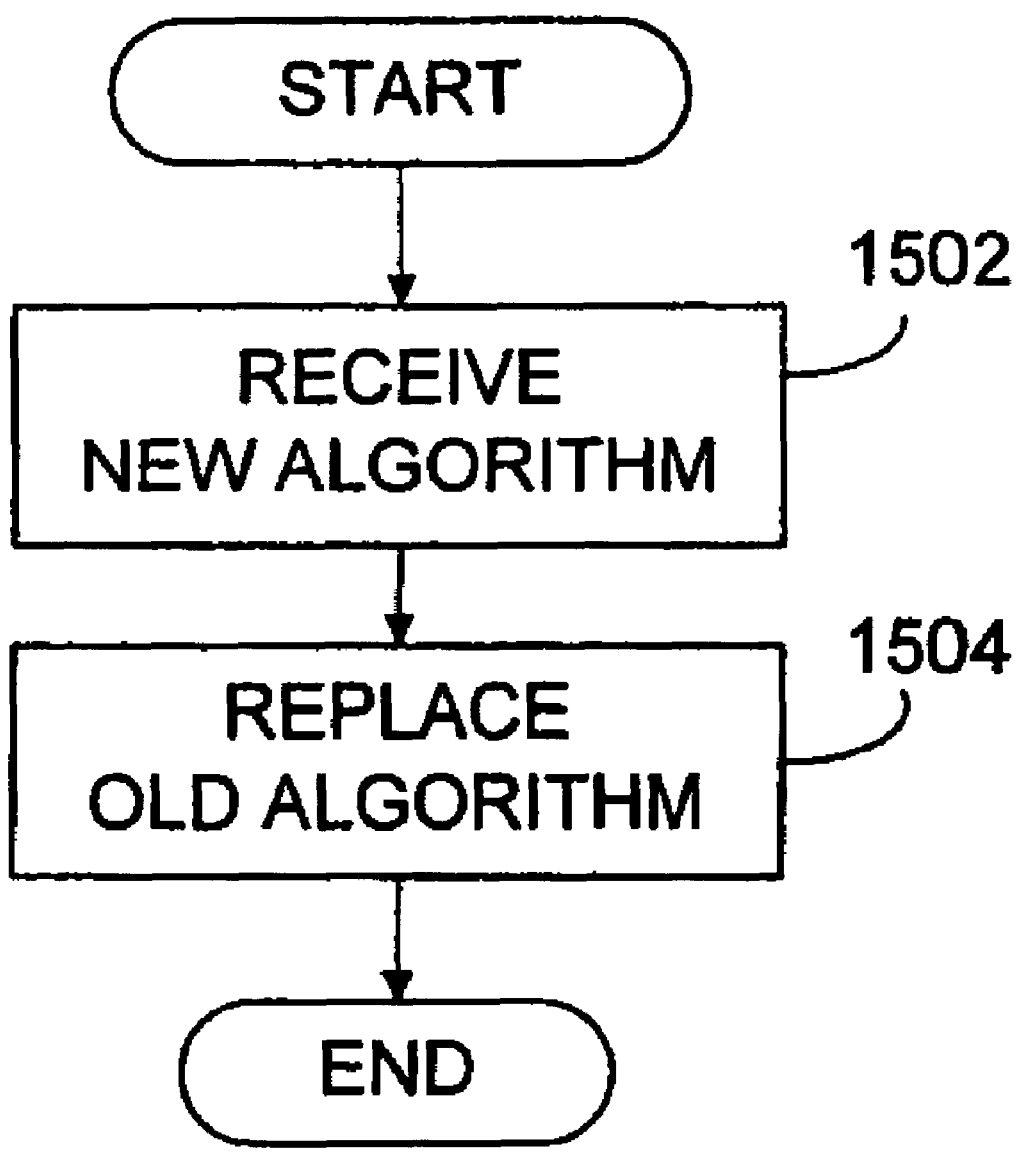
FIG. 15 depicts a flow diagram of the exemplary steps performed by the exposure set risk calculation block for replacing the risk calculation algorithm.

FIG. 15 depicts a flow diagram illustrating the steps performed by the exposure set risk calculation block for replacing the risk calculation algorithm. In FIG. 15, the exposure set risk calculation block first receives a new risk calculation algorithm datatype to which it has subscribed (step 1502). Then, the exposure set risk calculation block reads the new risk calculation algorithm from the datatype, and replaces its existing algorithm with the new risk calculation algorithm (step 1504). Accordingly, future exposure set risk calculations will be performed using this new algorithm. The risk calculation algorithm can therefore be updated asynchronously using a risk calculation algorithm datatype published from anywhere on the network.

Figure 16:
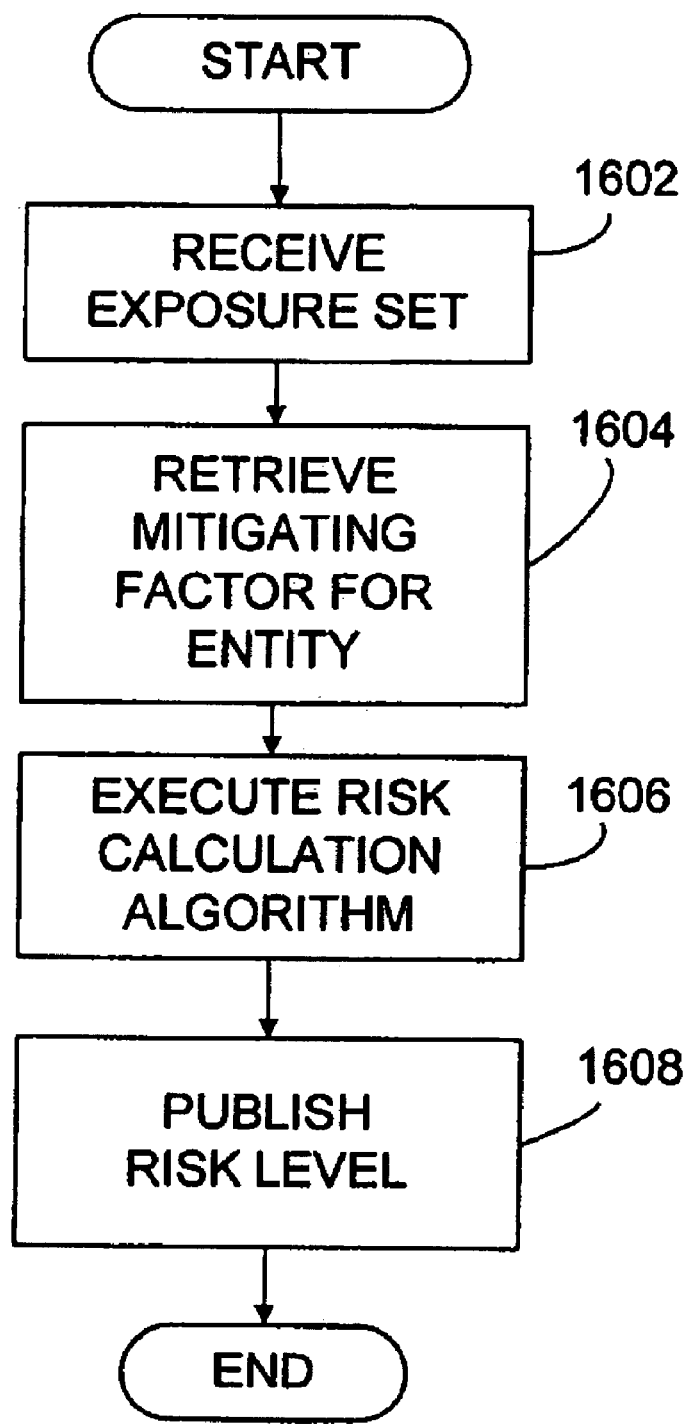
FIG. 16 illustrates a flow diagram of the exemplary steps performed by the exposure set risk calculation block for executing the risk calculation.

Referring to FIG. 16, this figure depicts a flow diagram illustrating the steps performed by the exposure set risk calculation block for executing the risk calculation. In FIG. 16, first, the exposure set risk calculation block receives an exposure set by subscribing to the exposure set datatype (step 1602). Then, the exposure set risk calculation block retrieves from the secondary storage a mitigating factor corresponding to the entity associated with the exposure set (step 1604). The mitigating factor is a constant factorial that is used in the risk calculation algorithm to mitigate the risk factor for the associated entity, and is based on known topological factors. For example, if an asset group has a history of having a lower probability of encountering problems, a support asset within the asset group has a higher mitigating factor associated with it. For the illustrative example, sample mitigating factors have a value in a range of 0-10 and are shown below. One having skill in the art will appreciate that the mitigating factors can have values in a range other than 0-10.

| Factor: | Measure: |
|---|---|
| Asset Group 120 non-domain | 1.3 |
| Asset Group 150 non-domain | 1.4 |
| Support Asset 140 | 2.0 |
| Asset Group 120 domain | 1.5 |
| Asset Group 150 domain | 1.7 |

After the mitigating factor is retrieved in step 1604, the exposure set risk calculation block executes the risk calculation algorithm using the retrieved mitigating factor and the exposure set information (step 1606). In the illustrative example, the following algorithm is used:

Risk Level=((Sum of Exposure Values*Sum of Confidence Values)/Number of Exposures)/Mitigating Factor Accordingly, in the illustrative example, if there is one exposure value in the exposure set, and the mitigating factor has a value of 1.5, then Risk Level=((100*1.0)/1)/1.5)=66.7.

One having skill in the art will appreciate that other algorithms can be used for the risk level calculation. Further, as described above, the algorithm can be replaced with new algorithms. After the risk level is calculated, the exposure set risk calculation block publishes the risk level in a risk level datatype to the bus (step 1608).

The exposure set risk calculation block can also calculate a difficulty value associated with fixing an entity to reduce its exposure level and a cost to perform the fix, and include these items in the risk level datatype. To calculate the difficulty value, the exposure set risk calculation block can, for example, look up the difficulty value in a look-up table. The look-up table contains one or more difficulty values associated with corresponding problems. The problems can be identified, for example, by a rule identifier or an entity name. For example, the look-up table can comprise an entry with an identifier of Rule 1, which is associated with a hard disk driver conflict problem, and a difficulty value of 10 in a range of 0 to 100. Further, the look-up table can also include a cost to repair a respective problem. In the above-described example, the look-up table can include entries for the service organization's fee and product costs associated with changing the hard disk driver. Based on these calculated risk-related values, a customer can determine whether they can continue to operate their system at the present risk level or whether they should repair their system.

To further assist in making this decision, the published risk levels can be analyzed for trends to predict problems. Typical trending techniques compare a single data stream against a threshold, and signal a problem if the data stream crosses the threshold. This can lead to false alerts when the data stream oscillates about the threshold.

The risk trending block 232 consistent with the present invention trends the risk level associated with an entity by calculating a moving average of the risk level for that entity. To compute the moving average, an incoming stream of exposure levels is compared to a known good stream. If there is a significant fluctuation across exposure levels that is not considered within normal fluctuations, then the risk trending block publishes a service action datatype.

To perform the moving average calculation, the risk trending block utilizes a training engine, such as the one described in U.S. patent application Ser. No. 10/690,917, filed concurrently with this application, for "Nearest Neighbor Approach for Improved Training of Real-Time Health Monitors for Data Processing Systems," to Michael J. Wookey, et al., which is incorporated herein by reference. Unlike typical trending techniques that analyse a single data set, the training engine can receive multiple data streams and analyse them against a known good state.

In order to obtain a known good stream that can be used for comparison to the incoming data streams, the risk trending block has three modes of operation: training mode, library mode, and observation mode. In the training mode, the risk trending block is trained to recognize the exposure levels of a typical entity in a class. The data stream obtained for a typical entity is referred to as a trained signal set. While in the library mode, the risk trending block associates the trained signal set with a hardware and software configuration, and stores this information in the services system as a signal library set. Then in observation mode, the risk trending block measures incoming current data streams against a nearest match of the signal library sets.

Figure 17:
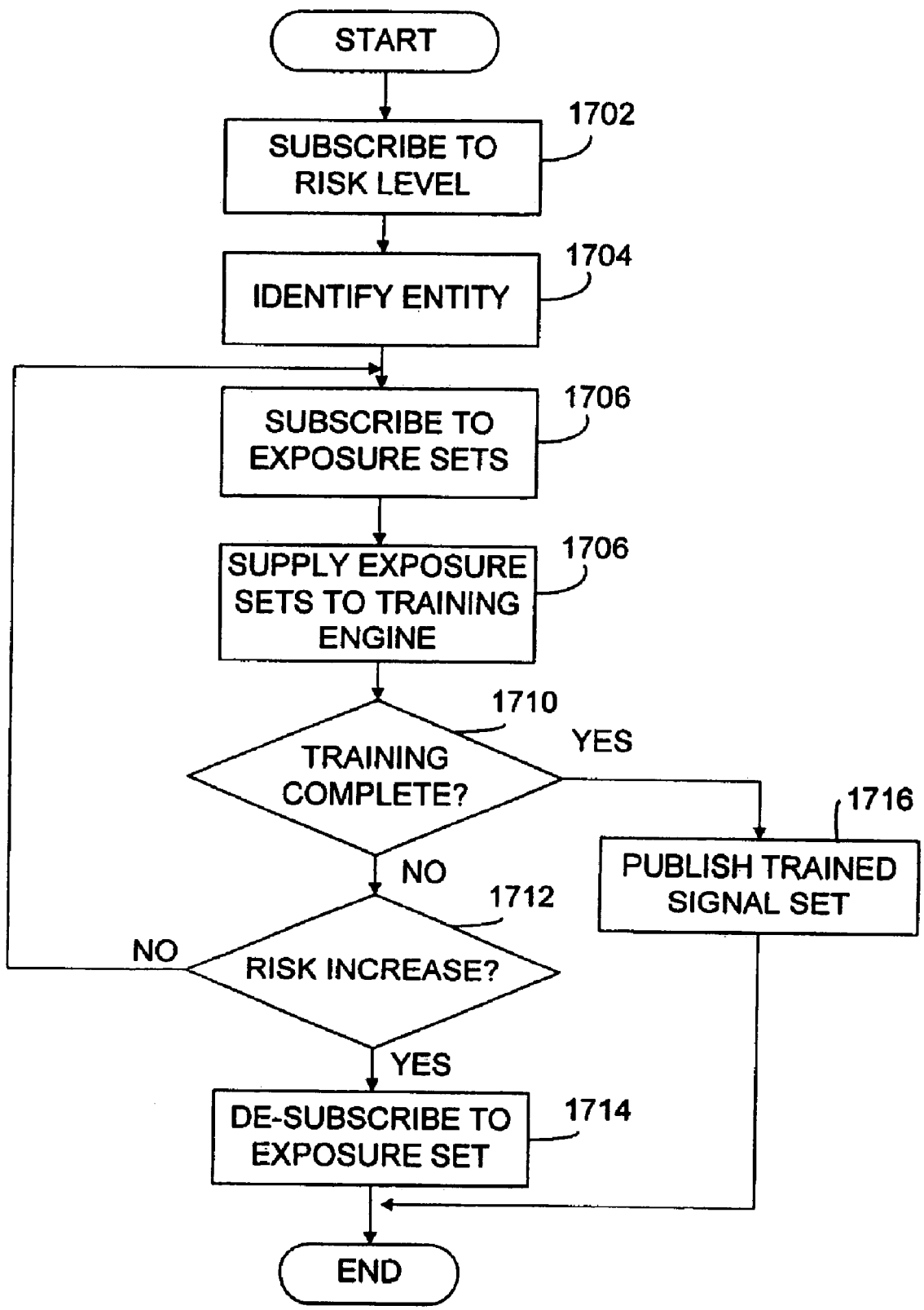
FIG. 17 shows a flow diagram of the exemplary steps performed by the risk trending block in the training mode.

FIG. 17 depicts a flow diagram of the exemplary steps performed by the risk trending block in the training mode. In FIG. 17, first, the risk trending block receives risk level datatypes to which it subscribes (step 1702). The risk trending block then identifies the received risk level datatypes that have a risk level below a predetermined value (step 1702). For example, the block identifies any risk level datatypes that have a risk level value below 10, where the risk level can have a value of 0 to 100. After identifying the risk level datatypes with low risk levels, the risk trending block then reads the support asset identifiers from those datatypes to identify the support assets that are associates with low risk levels (step 1704). These identified support assets define, to the risk trending block, support assets that are operating under a good risk level.

The risk trending block then subscribes to exposure sets for the identified support assets (step 1706), and supplies the received exposure sets to the training engine (step 1708). Exposure sets are continued to be received by the risk trending block until it determines that it has completed receiving exposure sets (step 1710). This can be determined, for example, by the risk trending block receiving a user input requesting to exit the training mode. Alternatively, the risk trending block can stop receiving exposure sets after a predetermined number of exposure sets have been received. If the risk trending block determines in step 1710 that it has not completed receiving exposure sets, then it determines whether the risk level for one of the identified support assets has increased (step 1712). If the risk level has increased, then the risk trending block stops subscribing to exposure sets for that support asset (step 1714). If the risk level has not increased, then the risk trending block returns to step 1706 to receive more incoming exposure sets.

Once the risk trending block determines in step 1710 that it is finished receiving exposure sets, then it retrieves the trained signal set for each identified support asset from the training engine and publishes the trained signal sets (step 1716). Each trained signal set represents a good risk level for that support asset.

Figure 18:
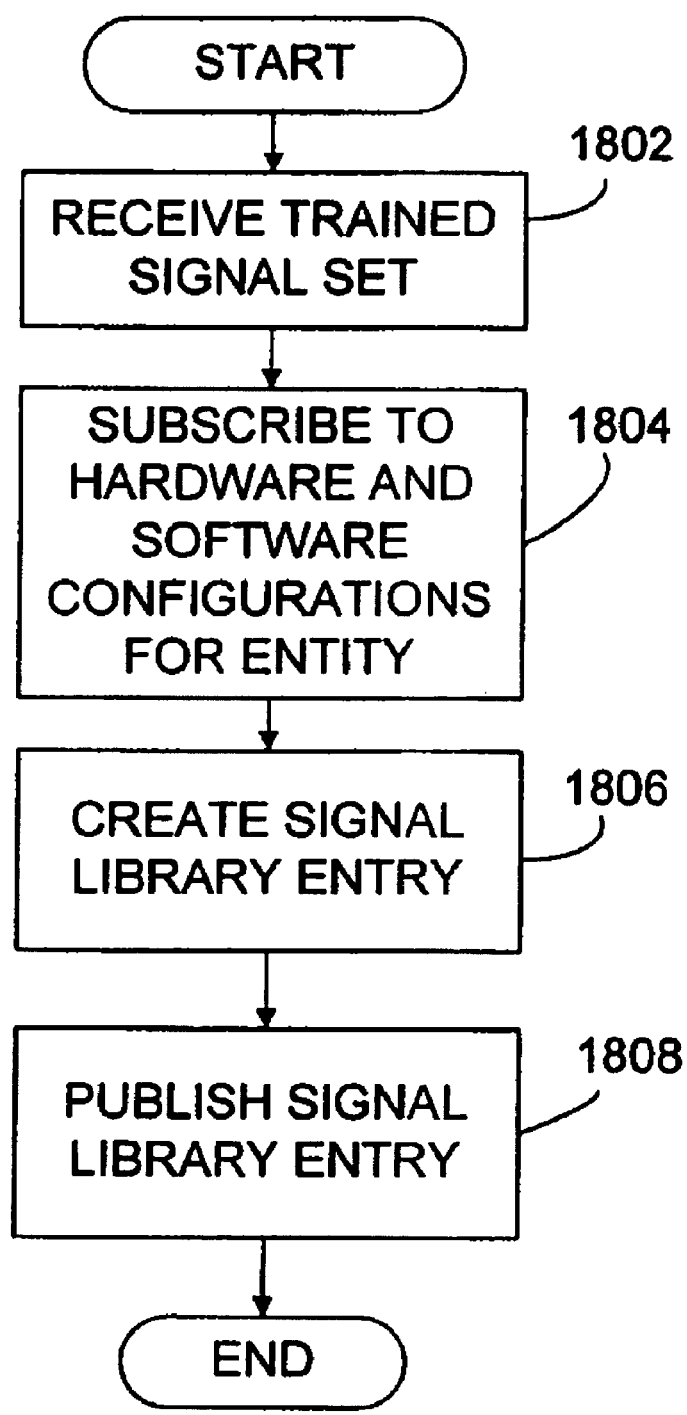
FIG. 18 shows a flow diagram of the exemplary steps performed by the risk trending block in the library mode.

After the risk trending block has generated the trained signal sets, as described above with reference to FIG. 17, the risk trending block is placed in library mode to associate hardware and software configuration information with the trained signal set. The risk trending block can be placed in library or observation mode automatically upon completion of precessing in the previous mode or manually by a user. In the library mode, for each support asset, the risk trending block creates a signal library entry that includes the trained signal set and its corresponding hardware and software configuration information. FIG. 18 depicts a flow diagram showing the illustrative steps performed by the risk trending block in the library mode. In FIG. 18, the risk trending block first subscribes to and receives a new trained signal set (step 1802). After a trained signal set is received in step 1802, the risk trending block subscribes to and receives the hardware configuration datatype and software configuration datatype for the support asset identified in the trained signal set (step 1804).

Once the hardware and software configuration information is received, the risk trending block creates a signal library entry that includes the trained signal set, the hardware configuration and the software configuration (step 1806). The block then publishes the signal library entry to the bus (step 1808).

Figure 19:
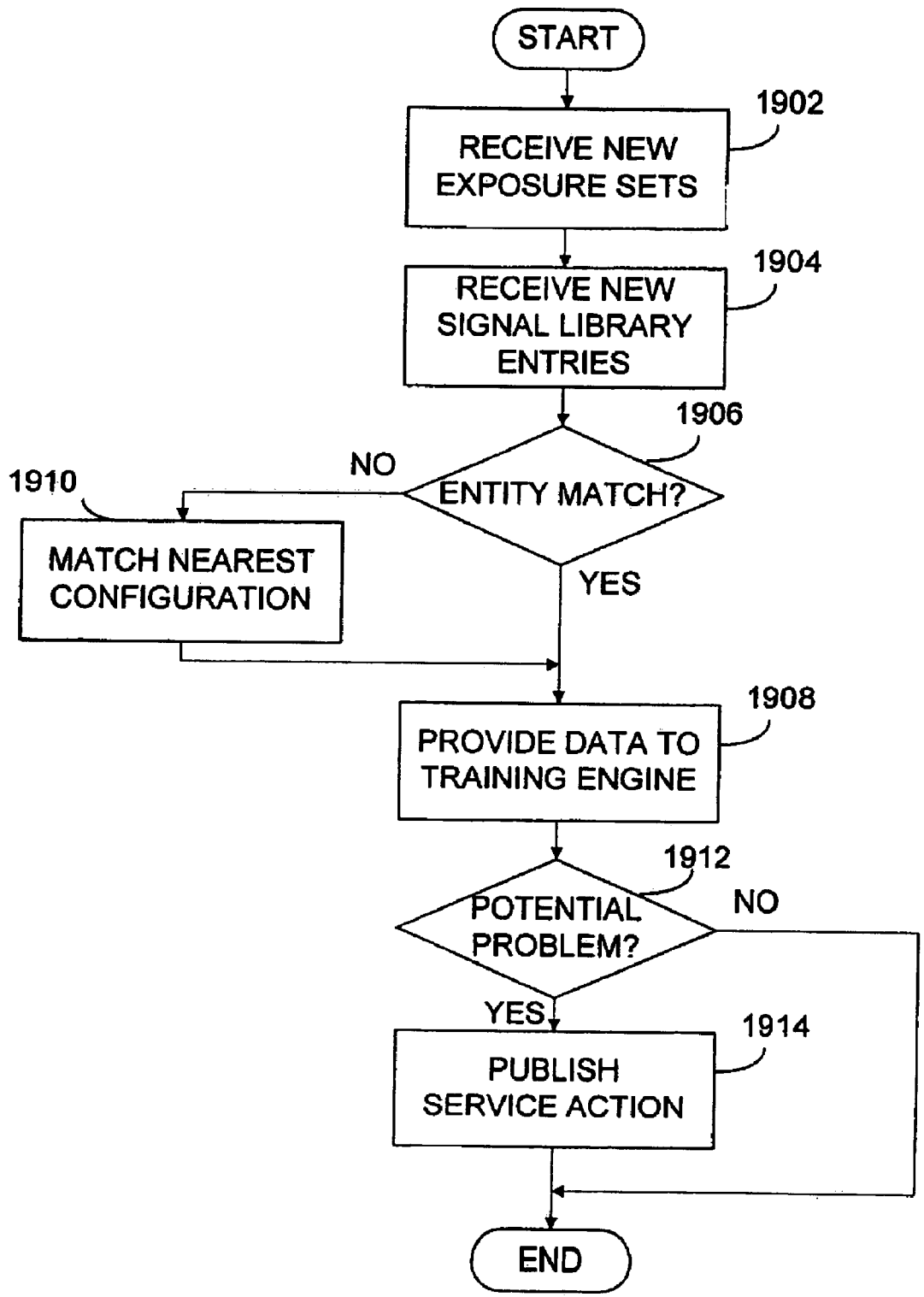
FIG. 19 depicts a flow diagram of the exemplary steps performed by the risk trending block in the observation mode.

After the risk trending block completes processing in the library mode, the risk trending block is placed in observation mode. In the observation mode, current exposure sets are measured against a match or nearest match from the signal library entries. FIG. 19 depicts a flow diagram showing the illustrative steps performed by the risk trending block in observation mode. Referring to FIG. 19, the risk trending block first subscribes to and receives new exposure sets (step 1902) and new signal library entries (step 1904). For each support asset identified in the exposure sets, the risk trending block then determines whether there is a matching signal library entry (step 1906). If there is a match in step 1906, the risk trending block provides the exposure set and signal library entry to the training engine (step 1908). Otherwise, the risk trending block matches the exposure set to a nearest hardware and software configurations among the signal library entries (step 1910) and then provides the nearest match exposure set and signal library entry to the training engine in step 1908.

The training engine compares the received exposure set to the signal library entry. If there is a predetermined difference between the exposure set and the signal library entry, then it calculates a probability of an existing problem. For example, if the exposure set varies from the signal library entry by more than 10 percent across all entries, then there is a certain probability of an existing problem. The risk trending block obtains the results of the training engine analysis and identifies whether the training engine found a potential problem (step 1912). If there is a potential problem, then the risk trending block publishes a service action identifying the potential problem (step 1914).

In addition to analysing fault information and configuration data, methods and systems consistent with the present invention also consider the availability of entities when managing exposure to failure and risk. The availability outage calculation block 236 calculates the availability of an entity based on received availability events. For purposes of this disclosure, the term availability event is used to cover events, which can be caught, that cause the entity to go out of service. Some illustrative examples of such events are, for example, a reboot, a panic, or a hardware failure.

Figure 20:
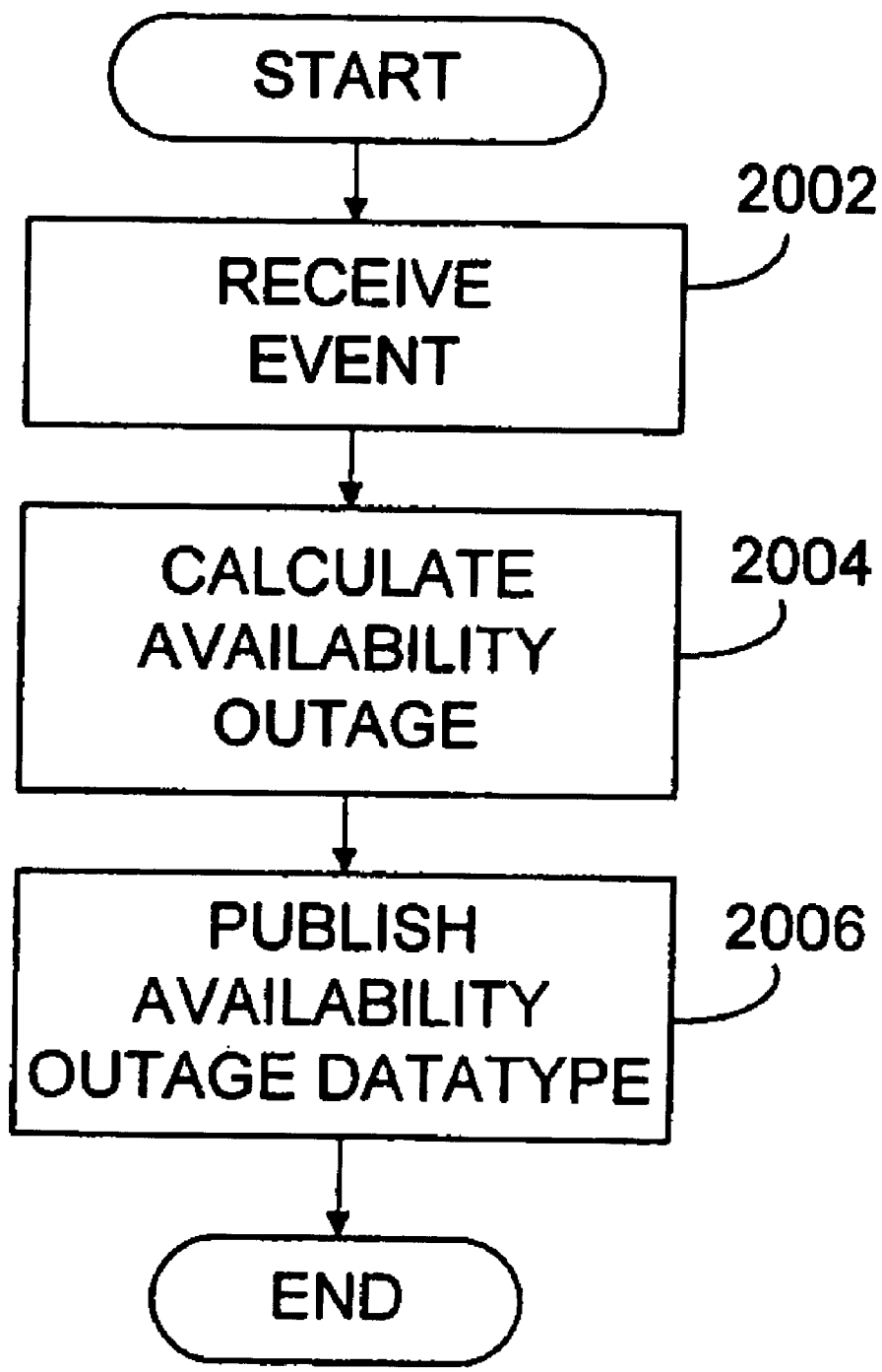
FIG. 20 shows a flow diagram of the exemplary steps performed by the availability outage calculation block.

FIG. 20 depicts a flow diagram illustrating the exemplary steps performed by the availability outage calculation block. In FIG. 20, first, the availability outage calculation block receives an event contained within an event datatype to which the block subscribes (step 2002). The capture of events and their publication in event datatypes is known to one having skill in the art and will not be described in more detail herein. In the illustrative example, a monitoring software 240 that runs in memory on the services system monitors the availability of an entity by "pinging" a specific known process that must be running for the entity to be operational. For example, if customer system 140 has the Solaris® operating system running in memory, the monitoring software can ping a process of the operating system to determine whether the operating system is operational. If the operating system is unavailable, the monitoring software publishes the event datatype including information about the entity and the entity's availability.

After the availability outage calculation block receives the event in step 2002, the availability outage block calculates the availability outage (step 2004). The availability outage calculation used for the illustrative example is as shown below, however, a different calculation can be used.

Availability Outage=(Downtime seconds/Total detection period)*100, where downtime is non-intentional After the availability outage is calculated in step 2002, the availability outage calculation block publishes the availability outage in an availability outage datatype to the bus (step 2004).

The availability mapping block 234 subscribes to availability outages and to service actions, which are published by the risk trending block, and compares availability outage history to risk trend information. A match can increase the probability of a trending problem occurring. For example, if a support asset was unavailable at specific times and the risk trending block published service actions relating to that support asset at those times, then there is a probability of a trending problem occurring.

Figure 21:
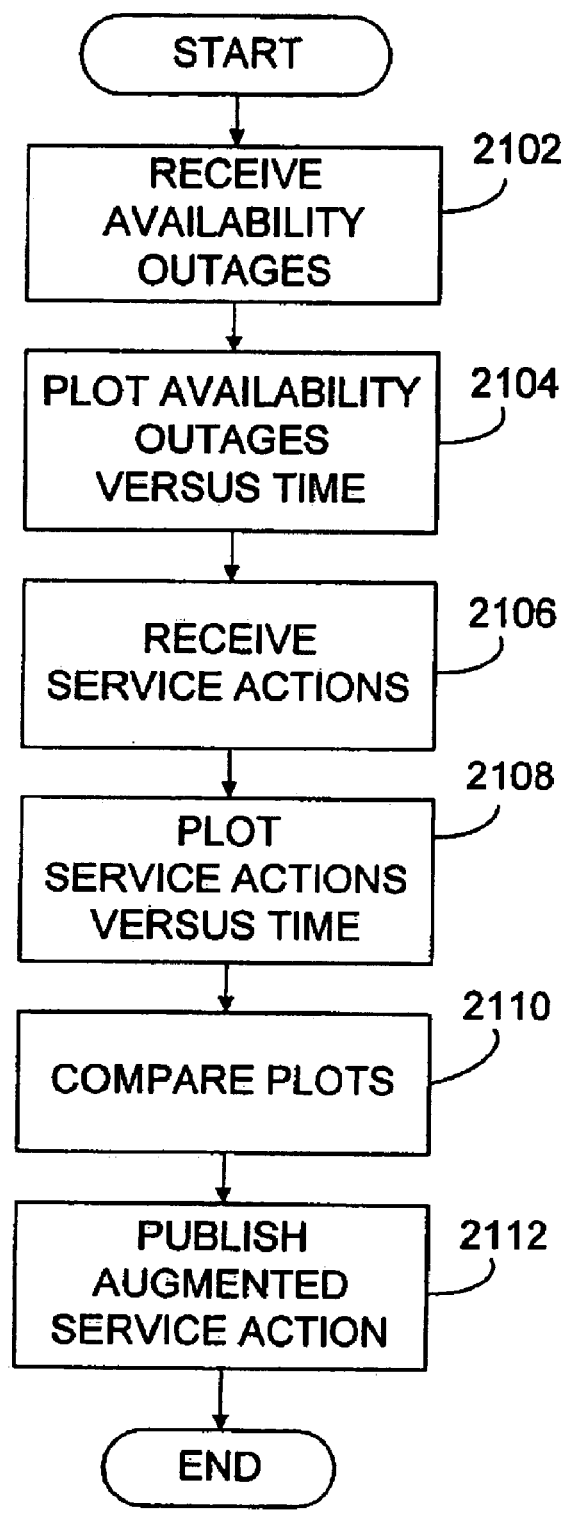
FIG. 21 illustrates a flow diagram of the exemplary steps performed by the availability mapping block.

FIG. 21 depicts a flow diagram illustrating the steps performed by the availability mapping block. In FIG. 21, first, the availability mapping block receives availability outages to which it subscribes (step 2102). The availability outage datatype identifies the entity associated with the availability outage. The availability outage mapping block stores a plot of availability outages over time for each entity in the services system secondary storage (step 2104). This block also receives any service action datatype published by the risk trending block (step 2106). And stores a plot of service actions over time for each entity in the services system secondary storage (step 2108).

Having compiled the availability outage and risk trending information for each entity, the availability mapping block compares the availability outages to the service actions at corresponding times for a particular entity (step 2110). The availability mapping block performs this operation when a new availability outage or service action is received. If there is a match in mapping of the two plots, then the availability mapping block publishes an augmented service action that identifies the increased probability of a trending problem occurring (step 2112).

Therefore, unlike typical risk management systems that are run on demand to perform discrete checks during a product installation and that use static knowledge, methods and systems consistent with the present invention asynchronously monitor the correctness of computer systems using dynamic rule engines, which are asynchronously deployable.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a program, the method comprising the steps performed by the program of:
generating a dataset having at least one exposure level to failure of a computer-based system and a corresponding rule identifier of a rule used to calculate the exposure level, the rule asynchronously receiving information about the computer-based system and calculating the exposure level based on the received information;
comparing the generated dataset to a previously generated dataset by comparing the at least one exposure level of the dataset to an at least one exposure level with the same rule identifier in the previously generated dataset, the previously generated dataset being associated with a known problem with the computer-based system; and
calculating a probability of a problem with the computer-based system based on a number of exposure levels in the generated dataset matching exposures levels in the previously generated dataset,
wherein the information about the computer-based system is received by subscribing to the information in a publisher/subscriber-based system.

2. The method according to claim 1, further comprising the step of outputting the calculated probability of a problem.

3. The method according to claim 2, wherein the output includes a description of the problem.

4. The method according to claim 1, wherein the exposure level comprises the exposure level multiplied by a confidence level of the exposure level, the confidence level having a value that is increased each time the corresponding rule calculates the exposure level.

5. The method according to claim 1, wherein the computer-based system is at least one of a data processing system, a component of a data processing system, and a computer program.

6. The method according to claim 1, wherein the received information comprises at least one of fault information, hardware configuration information, and software configuration information about the computer-based system.

7. A computer-readable medium containing instructions that cause a data processing system having a program to perform a method comprising the steps performed by the program of:
generating a dataset having at least one exposure level to failure of a computer-based system and a corresponding rule identifier of a rule used to calculate the exposure level, the rule asynchronously receiving information about the computer-based system and calculating the exposure level based on the received information;
comparing the generated dataset to a previously generated dataset by comparing the at least one exposure level of the dataset to an at least one exposure level with the same rule identifier in the previously generated dataset, the previously generated dataset being associated with a known problem with the computer-based system; and
calculating a probability of a problem with the computer-based system based on a number of exposure levels in the generated dataset matching exposures levels in the previously generated dataset,
wherein the information about the computer-based system is received by subscribing to the information in a publisher/subscriber-based system.

8. The computer-readable medium according to claim 7, further comprising the step of outputting the calculated probability of a problem.

9. The computer-readable medium according to claim 8, wherein the output includes a description of the problem.

10. The computer-readable medium according to claim 7, wherein the exposure level comprises the exposure level multiplied by a confidence level of the exposure level, the confidence level having a value that is increased each time the corresponding rule calculates the exposure level.

11. The computer-readable medium according to claim 7, wherein the computer-based system is at least one of a data processing system, a component of a data processing system, and a computer program.

12. The computer-readable medium according to claim 7, wherein the received information comprises at least one of fault information, hardware configuration information, and software configuration information about the computer-based system.

13. A data processing system comprising:
a memory having a program that
   generates a dataset having at least one exposure level to failure of a computer-based system and a corresponding rule identifier of a rule used to calculate the exposure level, the rule asynchronously receiving information about the computer-based system and calculating the exposure level based on the received information,
   compares the generated dataset to a previously generated dataset by comparing the at least one exposure level of the dataset to an at least one exposure level with the same rule identifier in the previously generated dataset, the previously generated dataset being associated with a known problem with the computer-based system, and
   calculates a probability of a problem with the computer-based system based on a number of exposure levels in the generated dataset matching exposures levels in the previously generated dataset,
   wherein the information about the computer-based system is received by subscribing to the information in a publisher/subscriber-based system; and
a processing unit that runs the program.

14. The data processing system according to claim 13, wherein the program further outputs the calculated probability of a problem.

15. The data processing system according to claim 14, wherein the output includes a description of the problem.

16. The data processing system according to claim 13, wherein the exposure level comprises the exposure level multiplied by a confidence level of the exposure level, the confidence level having a value that is increased each time the corresponding rule calculates the exposure level.

17. The data processing system according to claim 13, wherein the computer-based system is at least one of a data processing system, a component of a data processing system, and a computer program.

18. The data processing system according to claim 13, wherein the received information comprises at least one of fault information, hardware configuration information, and software configuration information about the computer-based system.

19. A data processing system comprising:
   means for generating a dataset having at least one exposure level to failure of a computer-based system and a corresponding rule identifier of a rule used to calculate the exposure level, the rule asynchronously receiving information about the computer-based system and calculating the exposure level based on the received information;
   means for comparing the generated dataset to a previously generated dataset by comparing the at least one exposure level of the dataset to an at least one exposure level with the same rule identifier in the previously generated dataset, the previously generated dataset being associated with a known problem with the computer-based system; and
   means for calculating a probability of a problem with the computer-based system based on a number of exposure levels in the generated dataset matching exposures levels in the previously generated dataset,
   wherein the information about the computer-based system is received by subscribing to the information in a publisher/subscriber-based system.

* * * * *